US005304917A

United States Patent [19]
Somerville

[11] Patent Number: 5,304,917
[45] Date of Patent: Apr. 19, 1994

[54] COMPACT LOW NOISE LOW POWER DUAL MODE BATTERY CHARGING CIRCUIT

[75] Inventor: Thomas A. Somerville, Tucson, Ariz.

[73] Assignee: Burr-Brown Corporation, Tucson, Ariz.

[21] Appl. No.: 63,163

[22] Filed: May 11, 1993

Related U.S. Application Data

[63] Continuation-in-part of Ser. No. 850,286, Mar. 12, 1992, abandoned, which is a continuation-in-part of Ser. No. 621,014, Nov. 30, 1990, Pat. No. 5,111,131.

[51] Int. Cl.$^5$ .............................................. H02J 7/00
[52] U.S. Cl. ......................................... 320/32; 320/20
[58] Field of Search .................................. 320/20, 32

[56] References Cited

U.S. PATENT DOCUMENTS

| 4,031,449 | 6/1977 | Trombly | 320/2 |
|---|---|---|---|
| 4,137,493 | 1/1979 | Smith | 320/39 |
| 4,163,934 | 8/1979 | Lawn | 320/23 |
| 4,549,127 | 10/1985 | Taylor et al. | 320/21 |
| 4,639,655 | 1/1987 | Westhaver et al. | 320/14 |
| 4,746,852 | 5/1988 | Martin | 320/20 |
| 4,755,735 | 7/1988 | Inakagata | 320/35 |
| 4,767,977 | 8/1988 | Fasen et al. | 320/20 |
| 4,806,840 | 2/1989 | Alexander et al. | 320/20 |
| 4,855,663 | 8/1989 | Matsui et al. | 320/20 |
| 4,897,591 | 1/1990 | Spani | 320/32 |
| 4,959,604 | 9/1990 | Cuesta | 320/20 |
| 5,111,131 | 5/1992 | Somerville | 320/32 |
| 5,172,044 | 12/1992 | Sasaki et al. | 320/22 |
| 5,200,690 | 4/1993 | Uchida | 320/20 |
| 5,212,439 | 5/1993 | Sano et al. | 320/39 |

FOREIGN PATENT DOCUMENTS

| 0147241 | 7/1985 | European Pat. Off. | H02J 7/04 |
|---|---|---|---|
| 0390079 | 3/1990 | European Pat. Off. | H02J 7/10 |
| 2344163 | 3/1977 | France | H02J 7/04 |
| 2638584 | 10/1988 | France | |
| 1276505 | 6/1972 | United Kingdom | H02J 7/00 |

OTHER PUBLICATIONS

"Fast-Charging Systems for Ni-Cd Batteries", by David A. Zinder, *Design Ideas*, 1970, pp. 65-67.

*Primary Examiner*—Steven L. Stephan
*Assistant Examiner*—Thomas M. Dougherty
*Attorney, Agent, or Firm*—Cahill, Sutton & Thomas

[57] ABSTRACT

A low noise battery charger includes a rectifier to convert AC line voltage to a rectified sinusoidal voltage that is applied to a primary winding of a transformer. Another rectifier coupled to a first secondary winding applies a charging current to a battery. A switch coupled in series with the primary winding controls current therein. A rectifier coupled to another secondary winding produces a battery condition voltage. An incrementing signal synchronized with the rectified sinusoidal voltage increments a ratchet DAC until its output voltage exceeds the battery condition voltage. A low charging mode signal is produced when the battery condition voltage falls a certain amount below the DAC output voltage. Flow of current through the primary winding is controlled by operating the switch at a relatively high frequency and by producing constant turn off times for the switch which are proportional to the resonant period of the primary winding circuit and also by modulating turn on times for the switch in response to the signal indicative of primary winding current. Maximum power transfer across the transformer is thereby achieved without flyback voltage of the transformer exceeding breakdown voltage of the switch, and zero current switching is achieved.

32 Claims, 9 Drawing Sheets

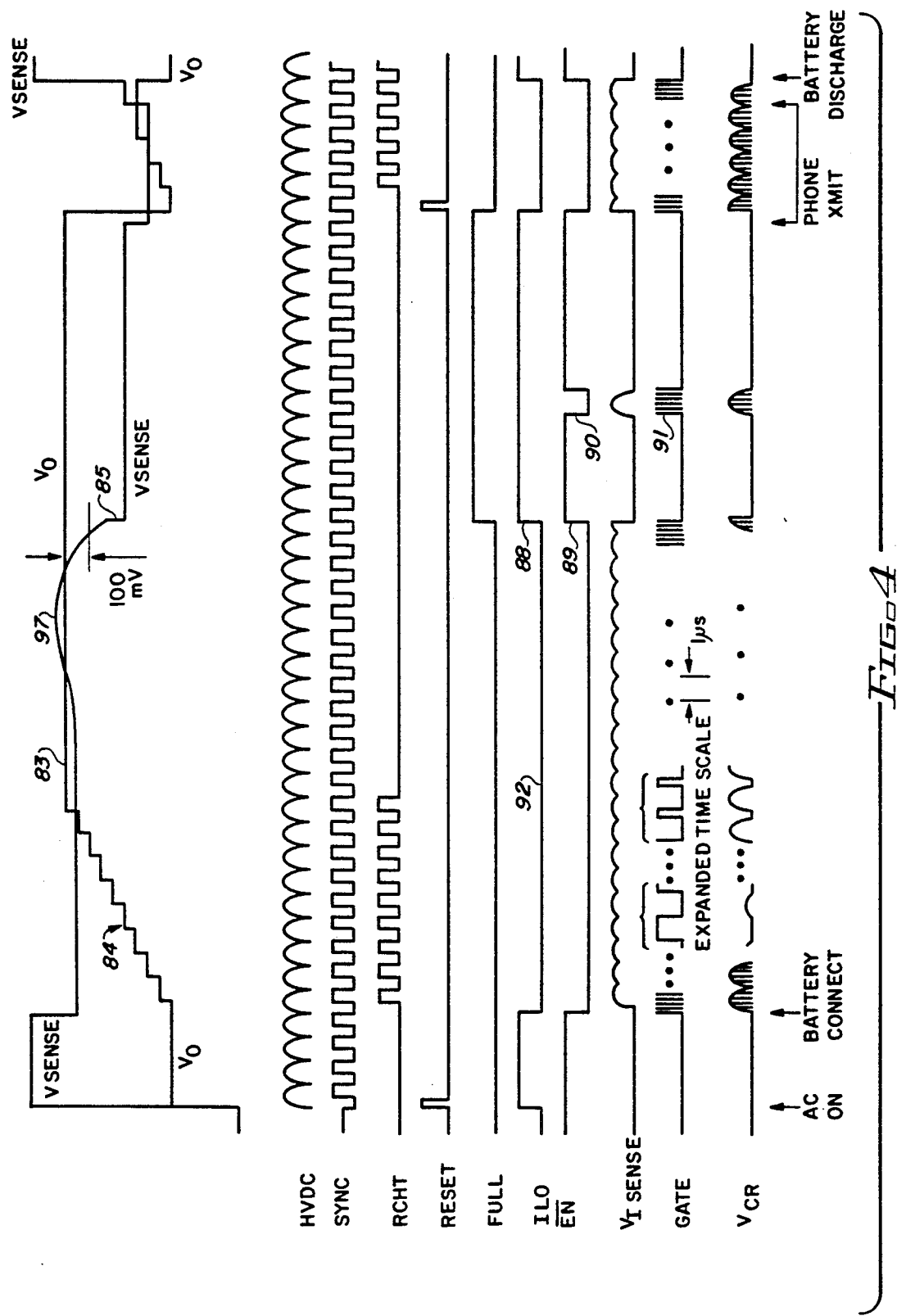

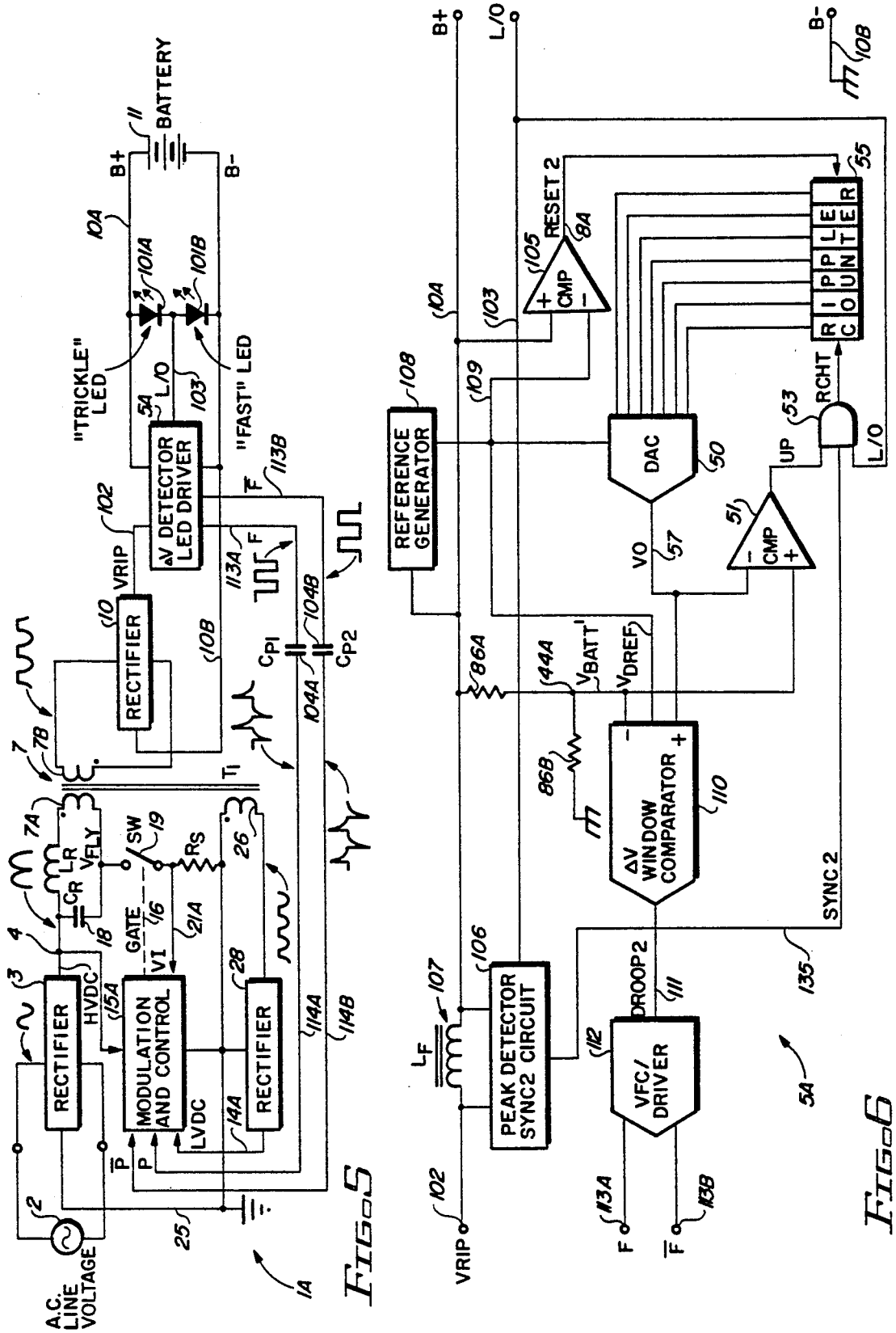

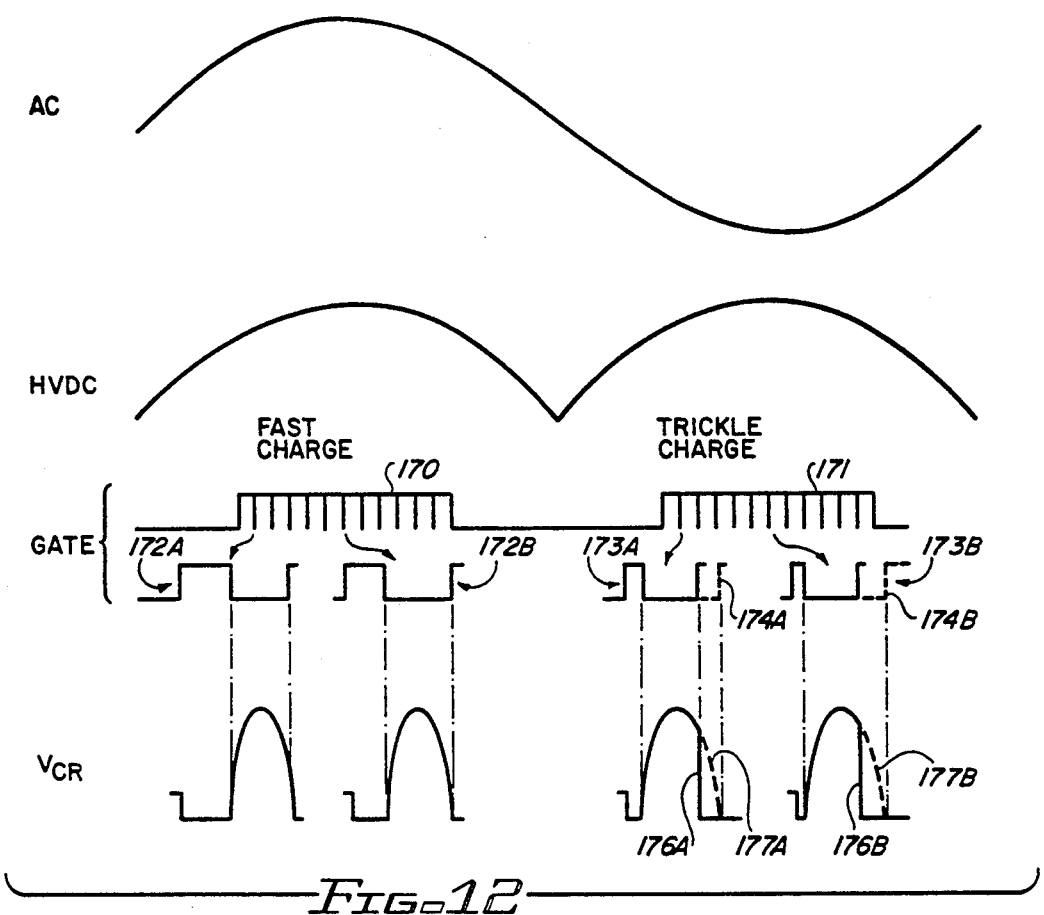
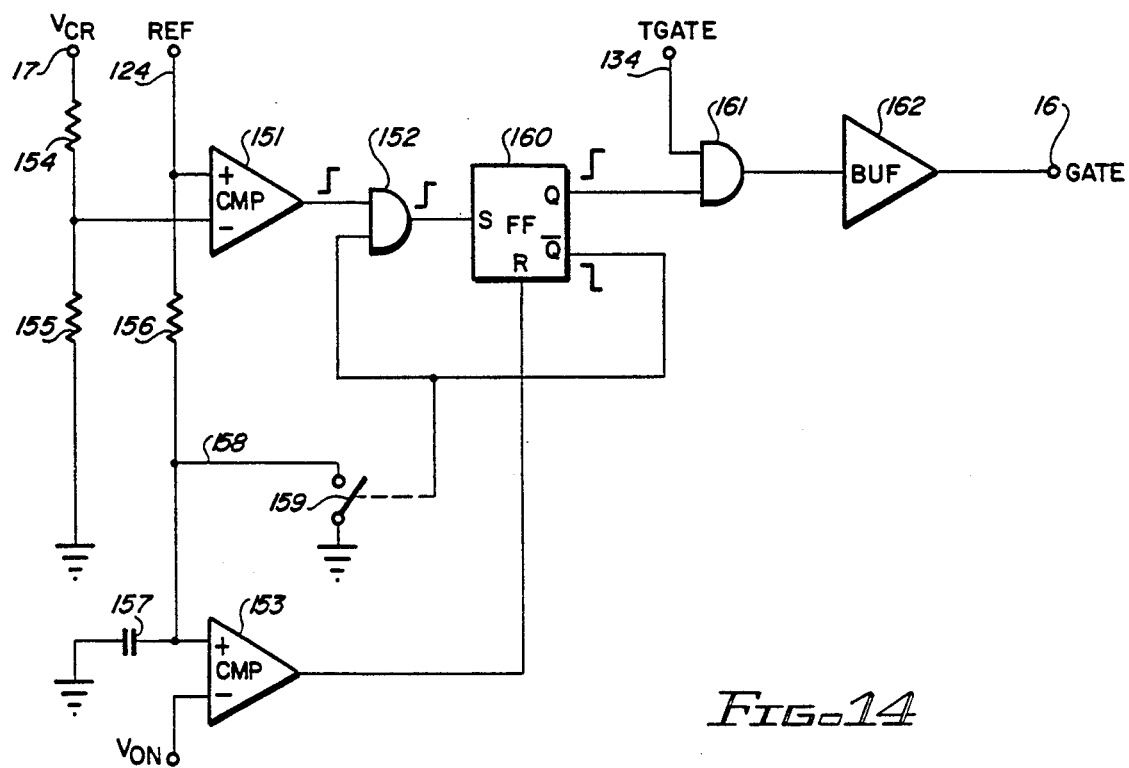

1

COMPACT LOW NOISE LOW POWER DUAL MODE BATTERY CHARGING CIRCUIT

CROSS-REFERENCE TO RELATED APPLICATION

This application is a continuation-in-part of commonly assigned copending allowed patent application Ser. No. 07/850,286 filed Mar. 12, 1992, entitled "COMPACT LOW NOISE LOW POWER DUAL MODE BATTERY CHARGING CIRCUIT", by the present inventor, which is a continuation-in-part of commonly assigned copending allowed patent application Ser. No. 621,014, filed Nov. 30, 1990, and entitled "COMPACT LOW NOISE LOW POWER DUAL MODE BATTERY CHARGING CIRCUIT" by the present inventor, which issued as U.S. Pat. No. 5,111,131 on May 5, 1992.

BACKGROUND OF THE INVENTION

The invention relates to a system for charging batteries, particularly nickel cadmium batteries. The invention relates more particularly to very small, compact battery charger circuits suitable for charging batteries of communications products without introducing electrical noise that may interfere with operation thereof.

A fully charged state of a nickel cadmium battery is achieved by controlling the charging when the terminal voltage falls or "droops" by a certain amount (for example, 100 millivolts) from its peak value during high current charging. Nickel cadmium batteries are known which are able to withstand a relatively high charging rate. A high battery charging rate is desirable in order to reduce the charging time and therefore the amount of time a battery is out of service. For a typical fast charge, a current that is numerically equal in amperes to the battery capacity in ampere hours is supplied to the battery for approximately one hour. It is known that high current charging of a nickel cadmium battery should be stopped soon after the onset of a negative rate of change of the battery voltage. There are known battery chargers that automatically sense a fully charged condition of a battery and then terminate the main charging current produced by the charger and substitute a trickle current. As the battery reaches full charge, the charging rate is reduced to a trickle charge or stopped. It is important to control the cutoff of charging so as to assure that the battery has been fully charged, and also to prevent overcharging that may damage the battery cells.

It is known that many communications products, such as portable cellular telephones, are highly sensitive to presence of electrical noise. Prior battery chargers generally introduce a substantial amount of electrical noise onto conductors connected to the terminals of the battery being charged. Furthermore, radiated high frequency interference may be picked up by rf amplifiers. If a communications product such as a portable cellular telephone is being used while its battery is being charged, such electrical noise is likely to deleteriously affect performance of the cellular telephone.

It would be highly desirable to provide a compact, low noise battery charger with low power dissipation that could be incorporated easily in a communications product or a power cord thereof to continually charge nickel cadmium batteries whenever the power cord is connected to a source of AC line current. Prior battery chargers which are inexpensive enough for this purpose unfortunately require a long (e.g., twelve hours) charging time. More elaborate "fast" battery chargers are expensive, large, consume too much power, and/or generate too much electrical noise to be used simultaneously in most communication products.

There is a presently unmet need for a compact, very low noise, inexpensive battery charger suitable for charging nickel cadmium batteries of noise-sensitive products, while allowing such products to be used while battery charging is occurring, without noise-caused operating problems.

SUMMARY OF THE INVENTION

Accordingly, it is an object of the invention to provide a low cost, low noise, compact, highly efficient battery charging apparatus and method.

It is another object of the invention to provide such a battery charging apparatus and method which provides very fast charging of a nickel cadmium battery without causing damage due to overcharging.

It is another object of the invention to provide a very compact battery charger capable of being incorporated in a power cord and applying sufficiently low electrical noise across its output terminals or radiated from within to allow use of noise-sensitive communications products and the like while rechargeable batteries thereof are being charged.

It is another object of the invention to provide a compact battery charger which accomplishes zero-voltage current switching of the primary current despite variations in a resonant period of a primary winding of a transformer thereof due to changes in voltage, current, or temperature in the primary winding.

Briefly described, and in accordance with one embodiment thereof, the invention provides a battery charger that includes a first rectifier receiving a line voltage and producing a rectified sinusoidal voltage. A transformer has a primary winding coupled to receive the rectified sinusoidal voltage, and second secondary winding. A second rectifier is coupled between the terminals of the first secondary winding and the terminals of a battery being charged. A switch is coupled between a terminal of the primary winding and a filter or other circuit that produces a signal indicative of current flowing through the primary winding. A first circuit produces a battery condition voltage that is proportional to the voltage present between the terminals of the battery being charged. A second circuit produces a timing signal in response to the rectified sinusoidal voltage. A third circuit is coupled to the output of a ratchet DAC to compare an output voltage of the ratchet DAC to a reference voltage proportional to the battery condition voltage. The ratchet DAC performs a peak detect and hold function. The third circuit produces an incrementing signal that is synchronized with the timing signal to increment the ratchet DAC until its output voltage exceeds the reference voltage. A fourth circuit is coupled to the output of the ratchet DAC to produce a low charging mode signal when the battery condition falls a predetermined threshold voltage below the DAC output voltage after a peak of the battery condition voltage has been attained. A fifth circuit is coupled to receive the low charging mode signal and the signal indicative of current flowing through the primary winding in order to produce a control signal. The control signal is applied to the switch to control flow of current through the primary winding in accordance with the battery sense voltage. The control signal applied to the switch is controlled to produce a very low duty cycle when the battery charger is in its low charging current mode. When the battery charger is in its high charging current mode, the on time of the switch is modulated continuously between the valleys and peaks of the rectified sinusoidal voltage in order to keep voltage across the switch from exceeding its breakdown voltage while obtaining maximum charging current to the battery. This is accomplished by circuitry that produces turn off times proportional to the resonant period of the primary winding circuit for the switch and variable turn on times for the switch in response to the signal indicative of current in the primary winding. This technique also accomplishes zero voltage, zero current switching of the switch, minimizing switching noise and power dissipation in the switch. The turn off time is set to one-half of the resonant frequency of the primary winding circuit to accomplish the zero voltage switching. The primary flyback voltage therefore has a half sine waveform returning to zero before the switch is turned on for the next cycle. Power loss in the switch is minimized, and the noise generated by the flyback voltage waveform is concentrated at the relatively high resonant frequency, with less energy at higher multiples of the frequency than would be the case with non-sinusoidal waveforms.

BRIEF DESCRIPTION OF THE DRAWINGS

FIGS. 4 is a timing diagram useful in describing the operation of the circuit of FIGS. 1–3.

FIG. 5 is a block diagram of an alternate embodiment of the battery charger.

FIG. 6 is a logic diagram of a ΔV detector and a LED driver circuit in FIG. 5.

FIG. 12 is a timing diagram useful in explaining the effect of changes in the resonant period of the primary winding resonant circuit resulting from varying load conditions.

FIG. 14 is a block diagram of a technique for modulating the turn on time and turn off time of the primary winding switch in FIG. 5 by sensing the flyback voltage applied by a terminal of the primary winding to a terminal of the primary winding switch.

DETAILED DESCRIPTION OF THE PREFERRED EMBODIMENTS

Figure 1:
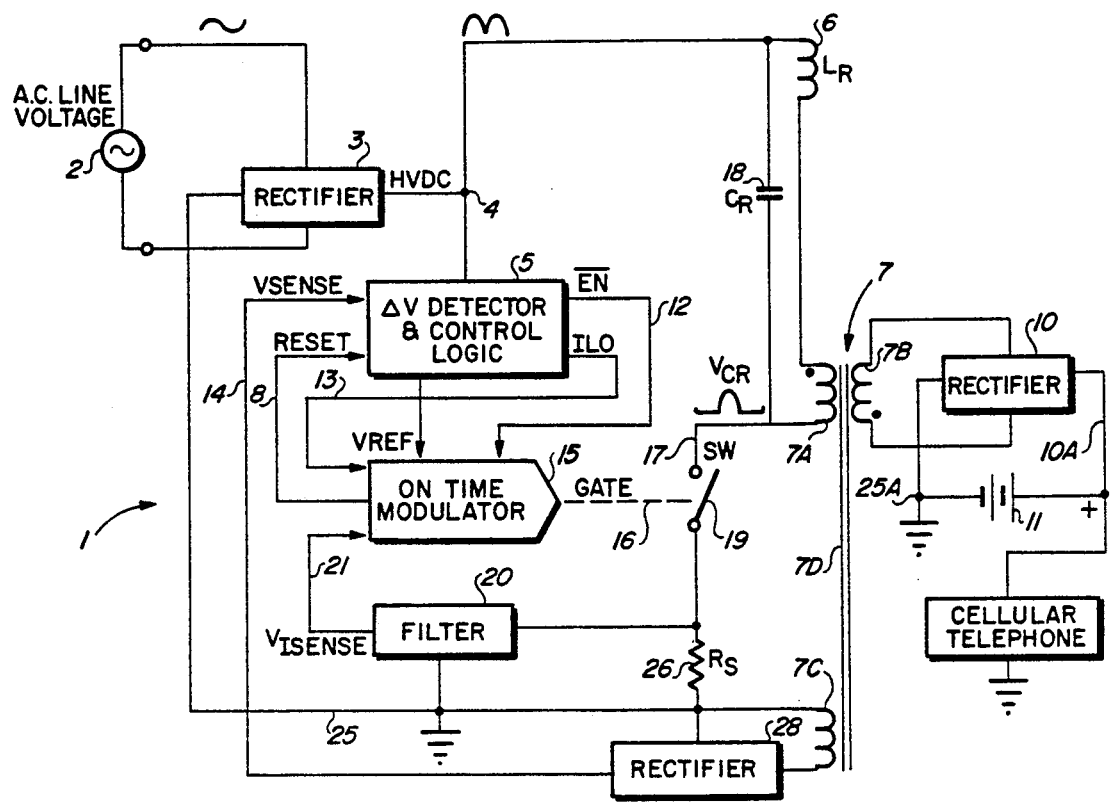
FIG. 1 is a block diagram of the battery charger of the present invention.

Referring to FIG. 1, battery charger circuit 1 receives AC line voltage 2 and rectifies it by means of a conventional full-wave rectifier 3 to produce the rectified HVDC (High Voltage DC) signal on its output conductor 4. Rectifier 3 has a ground terminal connected to a main ground conductor 25. Conductor 4 supplies HVDC to an input of a ΔV detector/control logic circuit 5 and also to one terminal of an inductance 6. Inductance 6 may be a discrete inductor, or it may be the leakage inductance of the primary winding 7A of a transformer 7.

Transformer 7 has a secondary winding 7B the terminals of which are connected to a half-wave rectifier 10. Rectifier 10 has a ground terminal connected to an "isolated" ground conductor 25A, and an output terminal 10A connected to the positive terminal of a nickel cadmium battery 11 to be charged.

Detector/control circuit 5 receives on conductor 14 a voltage $V_{SENSE}$ that accurately represents the present voltage of battery 11, and causes the charging rate of battery 11 to be decreased from a high current charging rate to a low current charging rate or trickle charge mode when a $V_{SENSE}$ voltage reduction or "droop" ΔV of the peak value 97 (FIG. 4) is detected. A signal RESET produced on conductor 8 by "on time" modulator circuit 15 is applied to an input of detector/control circuit 5, which produces an $\overline{EN}$ signal on conductor 12 and an ILO (low current charging mode) signal on conductor 13. Conductors 12 and 13 are applied to control inputs of modulator circuit 15. A voltage $V_{I\text{-}SENSE}$ produced on conductor 21 by filter circuit 20 is applied to a feedback input of modulator circuit 15.

Modulator circuit 15 produces an output signal on conductor 16 that controls the "on time" of a switch 19 so as to determine the charging rate of battery 11. Switch 19, when closed, conducts current flowing through primary winding 7A through conductor 17 into an input of filter circuit 20 and into resistor 26. A capacitor 18 having capacitance $C_R$ is connected between conductor 17 and HVDC conductor 4.

Transformer 7 has a ferrite core 7D which magnetically couples an additional secondary winding 7C to primary winding 7A. One terminal of secondary winding 7C is connected to main ground conductor 25, and the other terminal of inductor 7C is connected to an input of a half-wave rectifier 28. Rectifier 28 produces the voltage $V_{SENSE}$ on conductor 14.

Figure 2:
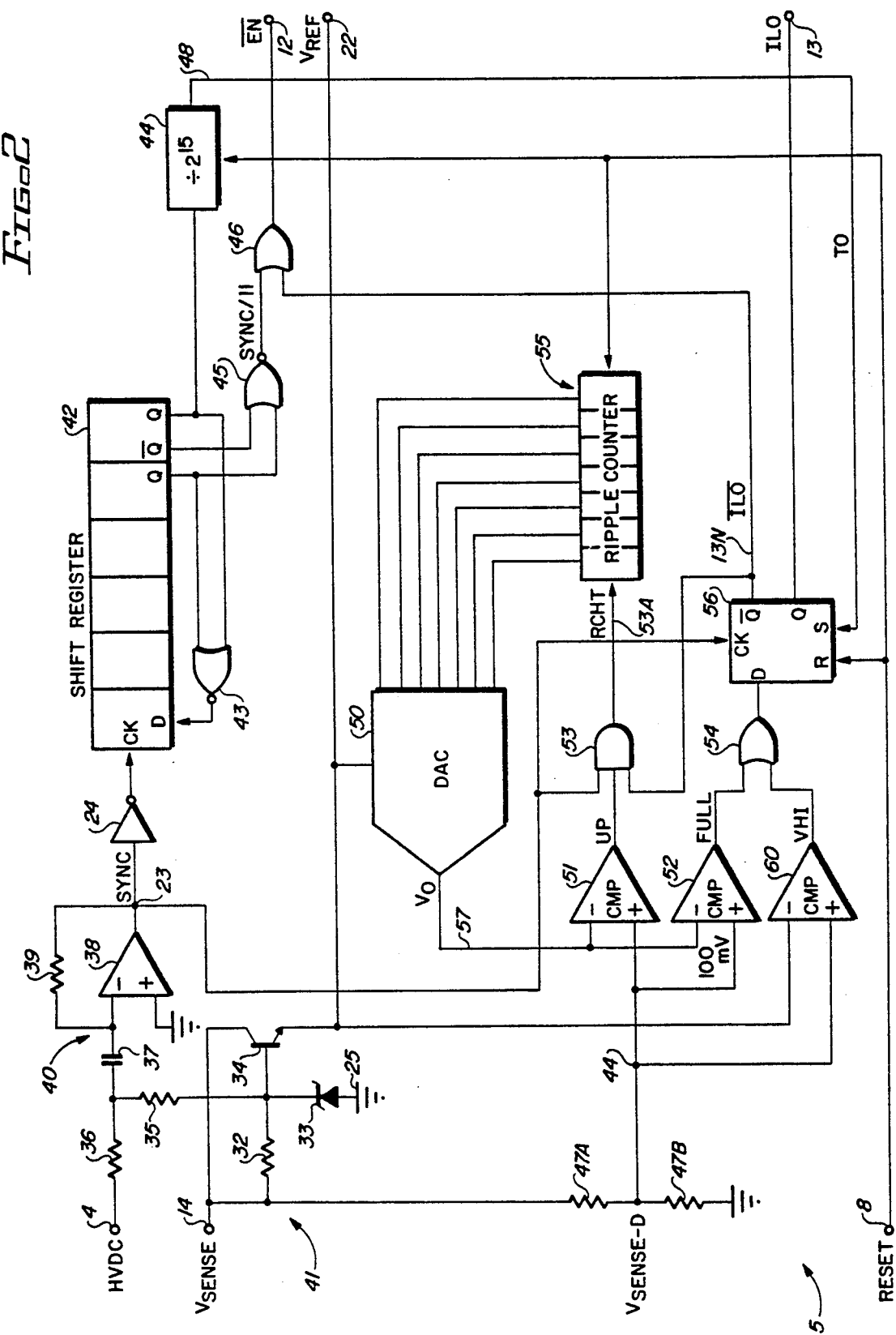
FIG. 2 is a logic diagram of part of the battery charger circuit of FIG. 1.

FIG. 2 shows the details of detector/control circuit 5. The signal HVDC on conductor 4 is applied via a resistive voltage divider 35,36 and a capacitor 37 to the inverting input of an operational amplifier 38, the output of which produces a timing signal SYNC on conductor 23. The non-inverting input of operational amplifier 38 is connected to ground conductor 25. Conductor 23 is connected through an inverter 24 to the input of one end of a shift register 42. Shift register 42 is comprised of six D type flip-flops. The Q output of the right hand flip-flop is connected to one input of a NOR gate 43 and to an input of a divider circuit 44 that divides that Q output signal by $2^{15}$. The $\overline{Q}$ output of the right hand flip-flop of shift register 42 is connected to one input of a two input NOR gate 45 which produces a signal SYNC/11 and applies it to the input of an OR gate 46. The Q output of the adjacent flip-flop of shift register 42 is connected to the other input of NOR gate 43 and to the other input of NOR gate 45. The output of OR gate 46 produces the signal $\overline{EN}$ on conductor 12.

The battery condition signal $V_{SENSE}$ on conductor 14 is applied to the collector of NPN transistor 34, to one terminal of resistor 32, and to one terminal of resistor 47A. The other terminal of resistor 32 is connected to one terminal of resistor 35 and to the cathode of a zener diode 33. The cathode of zener diode 33 also is connected to the base of NPN transistor 34. The anode of zener diode 33 is connected to the main ground conductor 25. The emitter of transistor 34 produces a constant reference voltage $V_{REF}$ equal to the breakdown voltage of zener diode 33 minus the $V_{BE}$ voltage of transistor 34 on conductor 22. Thus, current, and hence operating power supplied to $V_{REF}$ conductor 22 comes from $V_{SENSE}$ conductor 14 through the collector and emitter of transistor 34. $V_{REF}$ conductor 22 supplies current, and hence operating power, to DAC 50. Also, $V_{SENSE}$ conductor 14 supplies operating power to the circuitry including resistor 36 and capacitor 37. $V_{REF}$ conductor 22 is connected to the reference input of digital-to-analog (DAC) converter 50. Digital-to-analog converter 50 can be a Model DAC 7541 marketed by the assignee, although only 7 of the 12 bits are used.

$V_{REF}$ conductor 22 also is connected to the inverting input of a comparator 60. The non-inverting input of comparator 60 is connected via conductor 44 to the non-inverting input of a comparator 51, the inverting input of comparator 52, and to the junction between resistor 47A and a resistor 47B. The other terminal of resistor 47B is connected to main ground conductor 25.

The output of DAC 50 produces a voltage $V_0$ on conductor 57, which is connected to the inverting input of comparator 51 and the non-inverting input of comparator 52. Comparator 52 has a 100 millivolt input offset voltage.

The seven inputs of digital-to-analog converter 50 are connected to the outputs of a seven bit ripple counter 55. Ripple counter 55 is reset by the signal RESET generated by the circuit of FIG. 3. Divide-by-$2^{15}$ circuit 44 also is reset by the signal RESET. Ripple counter 55 is incremented by a signal RCHT ("ratchet") on conductor 53A by AND gate 53. One input of AND gate 53 is connected to SYNC signal conductor 23. Another input of AND gate 53 receives the signal UP from the output of comparator 51 to cause the output voltage $V_0$ of DAC 50 to "ratchet" higher. The remaining input of AND gate 53 receives the signal $\overline{ILO}$ on conductor 13N, which is connected to the $\overline{Q}$ output of a D type flip-flop 56. The signal $\overline{ILO}$ on conductor 13 also is applied to one input of OR gate 46. As subsequently will become apparent when the operation of the invention is described, DAC 50, ripple counter 55, AND gate 53 and comparator 51 co-act to produce a peak detect and hold function.

The clock input (CK) of flip-flop 56 is connected to SYNC conductor 23. The reset (R) input of flip-flop 56 is connected to RESET conductor 8. The set (S) conductor of flip-flop 56 receives the signal TO (time-out) produced on conductor 48 by divider circuits 42 and 44. The Q output of flip-flop 56 produces the signal ILO (low current charging mode) on conductor 13. The D input of flip-flop 56 is connected to the output of an OR gate 54, one input of which receives the signal FULL (indicating that battery 11 is fully charged) from the output of comparator 52. The other input of OR gate 54 receives the signal VHI (referring to a high voltage condition occurring because no battery is connected to charger circuit 1) produced at the output of comparator 60.

Figure 3:
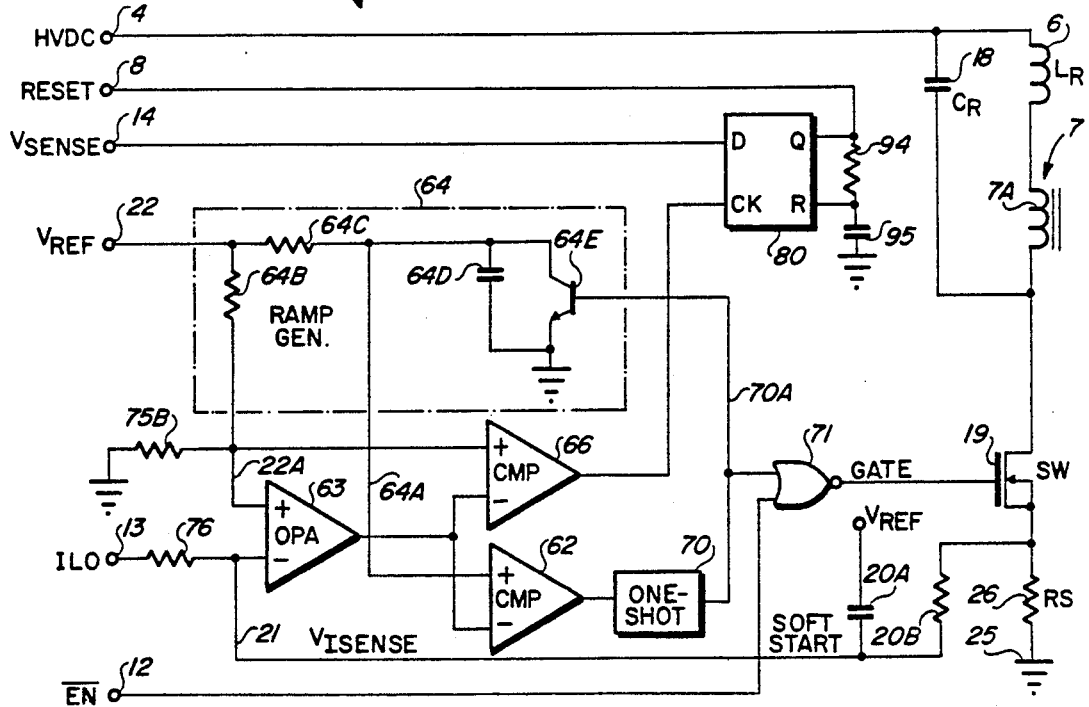
FIG. 3 is a detailed logic diagram of another part of the battery charger circuit of FIG. 1.

Referring next to FIG. 3, the details of on-time modulator circuit 15 and switch 19 are shown. The $V_{REF}$ voltage on conductor 22 is applied via a resistive voltage divider 64B,75B to the non-inverting input of error amplifier 63, the output of which is applied to the inverting input of comparator 66 and also to the inverting input of comparator 62. The non-inverting input of comparator 62 is connected to a ramp signal generator 64, which generates a 500 kilohertz ramp signal. Ramp generator circuit 64 is implemented by a circuit in which a constant current through resistor 64C flows charges up a capacitor 64D. One-shot 70 is triggered when the ramp voltage exceeds the output voltage of error amplifier 63. The one-shot resets the ramp to zero, and turns MOSFET 19 off. When one-shot 70 times out, it restarts ramp generator 64 by turning off transistor 64E.

The "divided down" representation of $V_{REF}$ appearing on conductor 22A is applied to the non-inverting input of error amplifier 63. The inverting input of error amplifier 63 is connected by resistor 76 to the ILO signal on conductor 13.

The output of comparator 62 is connected to the input of one microsecond one-shot circuit 70, the output of which is connected to one input of NOR gate 71. The other input of NOR gate 71 is connected by conductor 12 to receive the signal $\overline{EN}$. The output of NOR gate 71 produces the signal GATE and applies it to the gate electrode of N channel MOSFET 19, the drain of which is connected to a lower terminal of primary winding 7A and to the lower terminal of capacitor 18. The source of MOSFET 19 is connected by resistor 26 to ground conductor 25. The source of MOSFET 19 also is connected by resistor 20B to $V_{ISENSE}$ conductor 21 to the inverting input of operational amplifier 63. Resistor 20B and capacitor 20A constitute filter 20 of FIG. 1.

$V_{SENSE}$ conductor 14 is connected to the D input of D type flip-flop 80. The clock input of flip-flop 80 is connected to the output of comparator 66. The Q output of flip-flop 80 is connected by RESET conductor 8 to one terminal of resistor 94. The other terminal of resistor 94 is connected to the reset input of flip-flop 80 and to one terminal of capacitor 95, the other terminal of which is connected to main ground conductor 25.

A RESET pulse is generated by either a power turn on condition or a battery load condition. During power turn on, the soft start capacitor 20A initially causes the output of error amplifier 63 to be low, resulting in an initial minimum on time for switch 19 and a clock edge to flip-flop 80 from comparator 66. Resistor 94 and capacitor 95 determine the width of the RESET pulse.

During a battery load condition, $V_{ISENSE}$ rises, causing the output of operational amplifier 63 to fall below the divided down reference voltage $V_{SENSE-D}$, causing a clock edge to initiate the RESET pulse as described for a power turn on condition.

The basic operation of battery charger 1 is that the 60 hertz, 120 volt AC line voltage is rectified by full wave rectifier 3 to produce the sinusoidal HVDC waveform shown in FIG. 4. This waveform is input to the differentiating circuit 40 (FIG. 2) to produce the SYNC signal shown in FIG. 4. The leading edge of each SYNC pulse occurs at a maximum value of HVDC, i.e., at the middle of each rectified half wave. The trailing edge of each SYNC pulse occurs at a minimum value of HVDC.

The SYNC signal is applied to the input of AND gate 53 and D type flip-flop 56 (FIG. 2). The seven bit ripple counter 55 is resent by the signal RESET. If battery charger 1 is in its high current mode, $\overline{ILO}$ is a "1" enabling SYNC to produce the RCHT signal on conductor 53A, causing stepwise incrementing of $V_O$ as indicated by numeral 84 in FIG. 4. When $V_O$ exceeds $V_{SENSE-D}$ on conductor 44, comparator 51 causes the signal UP to go to zero, disabling SYNC from producing the RCHT signal. When $\overline{ILO}$ goes to a "0" as a result of a FULL="1" signal being applied by comparator 52 to an input of NOR gate 54, the SYNC signal is disabled, so ripple counter 55 is no longer incremented, and the analog signal $V_O$ produced by DAC 50 stops at level 83 in FIG. 4.

In accordance with the present invention, ratchet DAC 50 accurately holds level 83 until it is reset. Thus, RCHT is produced only while DAC 50 is being incremented, and flip-flop 56 then indicates either that the battery is fully charged or the battery is not connected. In either case, the Q output of flip-flop 56 forces the circuit into a low charging current mode.

If charger circuit 1 is not connected to battery 11, the voltage $V_{SENSE}$ obviously will increase to a high value, as the output current of battery charger 1 has nowhere to flow. Comparator 60 detects this condition and sets the signal VHI (voltage high) to a "1", forcing flip-flop 56 to establish a low current or trickle current charging mode. (The reason that it is desirable for battery charger circuit 1 to go into the low current mode if no battery is connected to the charger is because it is desirable to avoid wasteful power dissipation in the transformer.)

The FULL signal goes to a "1" to indicate that the battery has been fully charged when the voltage $V_{SENSE-D}$ has "drooped" or fallen more than approximately 100 millivolts, as indicated by numeral 85 in FIG. 4, at which point $V_O$ exceeds $V_{SENSE-D}$ by more than the 100 millivolt offset of comparator 52.

The inverting input of comparator 60 receives the $V_{REF}$ voltage on conductor 22, which is compared to $V_{SENSE-D}$. A high value of $V_{SENSE}$ produced by winding 7C and rectifier 28 under a "no load" condition on conductor 10A results in VHI going from a "0" to a "1", setting flip-flop 56, and initiating low current mode operation.

The voltage $V_{SENSE}$ produced by rectifier 28 (FIG. 1) has two functions, one being to accurately represent the battery voltage if a battery is connected, and the other being to supply power to the detector, controller, and modulator circuits.

Shift register 42 performs a divide-by-11 function. Divide-by-11 shift register 42 and a separate divide-by-$2^{15}$ circuit 44 generate a time out (TO) signal on conductor 48 that performs a "fail safe" function of setting the battery charger to a low current charging mode after one hour of high current charging operation. The divide circuits 42 and 44 divide the 60 hertz line frequency down enough to produce the signal TO after one hour. Shift register 42 and NOR gate 43 are configured as a so-called "walking ring" counter which performs the divide-by-11 function needed in conjunction with the divide-by-$2^{15}$ function to obtain the one hour delay by division of the 60 hertz line frequency.

Divide-by-11 shift register 42 performs a second function, which is to implement the low current mode operation by producing an enable pulse on conductor 12 every eleventh SYNC pulse. The $\overline{EN}$ signal on conductor 12 is gated by the $\overline{ILO}$ signal on conductor 13N.

The rising edge 88 (FIG. 4) of ILO results in a corresponding falling edge of $\overline{ILO}$ that gates the SYNC/11 signal through OR gate 46 to produce $\overline{EN}$. The SYNC/11 signal is a "0" every eleventh SYNC pulse, and is a "1" the rest of the time. The $\overline{EN}$ signal therefore has a "0" value indicated by numeral 90 in FIG. 4 during the SYNC/11 pulse if ILO is positive. The output of one-shot circuit 70 produces pulses that are gated through NOR gate 71 by $\overline{EN}$ as shown in FIG. 3, producing the burst of GATE pulses indicated by numeral 91 during every eleventh SYNC pulse. This turns MOSFET switch 19 on and off at approximately the 500 kilohertz rate and thereby causing the trickle current or low current charging.

The widths of the GATE pulses during the high current mode, when ILO is a "0" as indicated by numeral 92 in FIG. 4, and is determined by circuitry in the on-time modulator 15, as shown in detail in FIG. 3.

The voltage on the $V_{ISENSE}$ conductor 21 is an analog voltage which is initiated by the source electrode of MOSFET switch 19 at the frequency of on time modulator 15 (which is a frequency of about 500 kilohertz). The high frequency component is filtered out of this by filter 20. At each peak value of HVDC there is a peak of current and of $V_{ISENSE}$, and at each minimum or valley of HVDC there is a minimum of current $V_{ISENSE}$. This results in the "ripple" appearance of $V_{ISENSE}$ in FIG. 4.

$V_{ISENSE}$ is fed back to the input of on-time modulator 15 to force the ripple of $V_{ISENSE}$ to be as small as possible. This is accomplished by having a maximum on-time for switch 19 during the valleys of HVDC, and a minimum on-time for switch 19 during the peaks of HVDC. A maximum fifty percent duty cycle is indicated in the expanded time scale portion of the GATE signal at the valleys of HVDC in FIG. 4. The much smaller duty cycle corresponds to the peaks of HVDC. The duty cycle of GATE during the high charging current mode operation varies continuously between these extremes over every half cycle of the line voltage. This has the effect of maximizing the total power output of the battery charger circuit 1 while preventing the drain-to-source breakdown voltage of MOSFET 19 from being exceeded.

It should be appreciated that the "flyback" voltage $V_{CR}$ on conductor 17 (FIG. 1) can be approximately one thousand volts or more when switch 19 is turned off while a large current is flowing in primary winding 7A. More specifically, at the peaks of HVDC, the drain-to-source breakdown voltage of MOSFET 19, which typically might be 1000 volts, would be exceeded if the on time of MOSFET 19 has a 50 percent duty cycle value at that time. It should be appreciated that if the on time of MOSFET 19 is set to a constant smaller value which avoids the condition of $V_{CR}$ exceeding a thousand volts, then less power would be delivered to secondary winding 7B, rectifier 10, and battery 11 during the "valleys" of HVDC than if MOSFET 19 is on for a long time.

In accordance with the present invention, the on time of MOSFET 19 is continuously modulated by $V_{ISENSE}$ in order to achieve maximum power coupled across transformer 7 without exceeding the breakdown voltage of MOSFET 19. Furthermore, continuous modulation of the on time of MOSFET 19 provides a mechanism to keep the charger output current constant as the battery voltage rises and as transformer inductance and/or loss changes with ambient temperature. Furthermore, the current control provides a maximum current limit to protect the charger from defective (e.g., shorted) cells in the battery pack.

Error amplifier 63 amplifies the difference voltage between $V_{ISENSE}$ conductor 21 and the divided-down reference voltage $V_{SENSE-D}$ on conductor 22A. Its output goes to an input of comparator 62 and completes a feedback loop in such a way as to minimize the difference in voltage between conductors 21 and 22A. An increase in this difference results in an increase in the output voltage of amplifier 63 such that the ramp generator voltage takes longer (i.e., greater switch on time) before causing comparator 62 to switch. Thus, the longer on time of switch 19 increases the average primary current which opposes the initial difference voltage.

Ramp generator circuit 64 produces a ramp signal at a rate of about 500 to 1000 kilohertz to provide a modulating signal that is used to convert the voltage produced by error amplifier 63 into a time delay that actuates one-shot 70 and also represents the on time of MOSFET 19. One-shot circuit 70 determines the widths of the "0" level portions of the GATE waveform and hence the "off time" of MOSFET switch 19. The point at which the 500 kilohertz ramp signal produced on conductor 64A exceeds the output voltage produced by error amplifier 63 determines the width of the "1" portions of the GATE waveform and hence the "on time" of MOSFET 19. When one-shot 70 times out, the signal on conductor 70A resets the output of ramp generator 54 as explained above and the ramp signal is repeated.

The timeout duration of one-shot 70, which is equal to the off time of MOSFET 19, is designed to be equal to one-half of the period of the resonant frequency established by the transformer primary winding inductance $L_R$ and the resonant capacitor $C_R$. The intervals during which MOSFET switch 19 is off is given by the expression $$T_{off} = \pi \sqrt{L_R C_R} .$$

For cases where $L_R$ and $C_R$ are constant with operating conditions, the one-shot time out duration can be made constant. Otherwise, the off time can be automatically adjusted for changes in the resonant period of the primary winding circuit. The primary flyback voltage $V_{CR}$ therefore has a half sine waveform returning to zero before MOSFET 19 is turned on for the next cycle. Thus, the power loss in MOSFET switch 19 is minimized, and noise generated by the flyback waveform $V_{CR}$ is concentrated at the resonant frequency of about 500 kilohertz, with less energy at higher multiples of the frequency than would be the case for a flyback voltage with a non-sinusoidal shape. This results in "zero voltage switching" of MOSFET 19, so it is turned on when there is zero voltage (drain-to-source) across it.

The on time of MOSFET 19 is modulated by the feedback voltage $V_{ISENSE}$ which represents the amount of current flowing in primary winding 7A.

The modulation of the on time of MOSFET 19 by means of the feedback voltage $V_{ISENSE}$ (which represents the current in primary winding 7A) results in minimum power dissipation in MOSFET 19, and essentially eliminates switching transients, which, if present, would produce undesirable electrical noise that might interfere with operation of communications equipment connected to battery 11 or in its vicinity while it is being charged.

The $V_{ISENSE}$ waveform contains several components, including a DC component that represents the average power in primary winding 7A, and an AC component that represents the switching frequency (about 500 to 1000 kilohertz) of MOSFET 19, and another AC component at the 60 hertz line frequency that appears as ripple, as an envelope of $V_{ISENSE}$. This envelope signal is compared by comparator 62 with the ramp signal on conductor 64A of FIG. 3 to produce the on time modulation of the GATE waveform. (Although during the off time of MOSFET 19, the primary winding circuit oscillates for half a cycle at the resonant frequency, when MOSFET 19 is on the primary winding circuit does not resonate, so the on time of MOSFET 19 can be varied independently of the resonant frequency.)

HVDC energizes the primary winding of the transformer. The power to the modulator is supplied from the $V_{SENSE}$ line.

RESET signal 8 is used to reset flip-flop 56, the ripple counter for the ratchet DAC, and the hour timer that generates the time-out signal TO.

The technique of using ratchet DAC 50 and associated circuitry might be replaced by a peak detect and hold circuit in combination with circuitry that would compare the peak detect and hold circuit output voltage with the instantaneous battery voltage to determine whether the "droop" characteristic of achieving a fully charged battery condition has occurred; the results of that comparison then could be used to establish a low current charging mode.

The $V_{ISENSE}$ voltage alternatively could be implemented by means of an additional transformer, the primary winding of which conducts the current also flowing in primary winding 7A. A secondary winding of the additional transformer would generate a signal indicative of current flowing through primary winding 7A.

Figure 7:
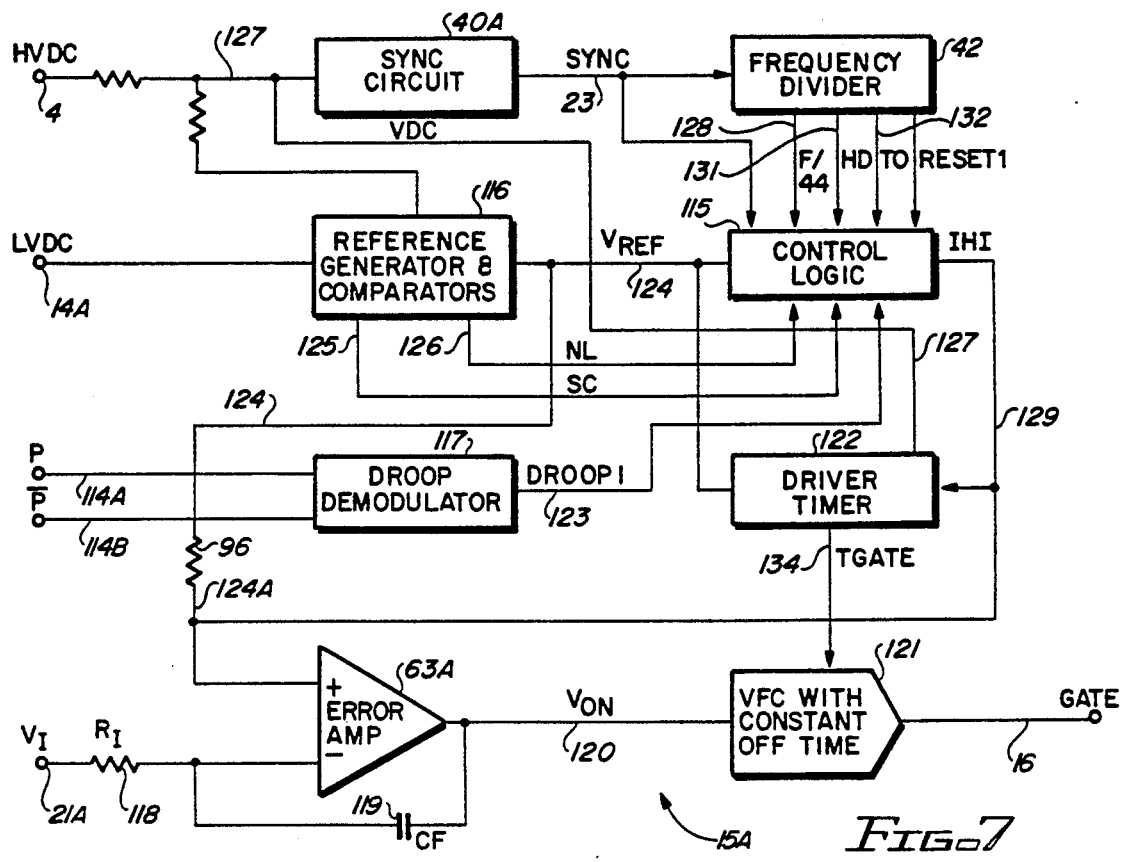
FIG. 7 is a more detailed block diagram of a modulation and control circuit in FIG. 5.

An alternate embodiment of the invention is shown in FIGS. 5-7. In many respects, the low noise, high rate battery charger 1A of FIG. 5 is similar to the one shown in FIG. 1. However, in the circuit of FIG. 5, the battery voltage is detected by circuit 5A, which, although similar to the $\Delta V$ detector circuit 5 of FIG. 1, is located on the "battery side" rather than the "line side" of the isolation transformer 7. The second secondary winding 26 and rectifier 28 are used in the circuit of FIG. 5 to produce power for the modulation and control circuit 15, but are not used to generate a signal indicative of the battery voltage. A signal LVDC (analogous to $V_{SENSE}$ of FIG. 1) produced by rectifier 28 provides an indication as to whether the battery connection terminals 10A and 10B are open-circuited or effectively short-circuited.

In the circuit of FIG. 5, the condition of the battery is indicated by frequency-modulated signals coupled across isolation barrier capacitors 104A and 104B and then applied to inputs of modulation and control circuit 15A. A voltage to frequency converter 112 in circuit 5A (See FIG. 6) produces two different frequency signals F and $\overline{F}$ which are coupled across isolation barrier capacitors 104A and 104B to produce signals P and $\overline{P}$ on conductors 114A and 114B which indicate the presence of a droop $\Delta V$ of, for example, at least 100 millivolts.

$\Delta V$ detector/LED driver circuit 5A also produces an output signal L/O (LED Output) on conductor 103 connected to the cathode of a light emitting diode 101A that is illuminated when the charger is in a trickle charge mode and to the anode of a light emitting diode 101B that is illuminated when the battery charger is in a fast charge mode.

In FIG. 5, the LED driver signal L/O on conductor 103 is connected such that when L/O is at a "0" level corresponding to the trickle charge mode, LED 101A is forward-biased and therefore illuminated, and LED 101B is reverse-biased and therefore off. The opposite condition exists when L/O is a "1" and the battery charger is in the fast charge mode. This configuration allows the indicator LEDs 101A and 101B to be located either on the battery charger or a battery location between its terminals simply by running conductor 103 to the battery along with the battery cable lines 10A and 10B.

Rectifier 3 of FIG. 5 functions essentially the same as rectifier 3 in FIG. 1 to produce the full-wave rectified signal HVDC on conductor 4. The signal SYNC produced on conductor 23 in FIG. 7 is produced by differentiation circuitry in sync circuit 40A in FIG. 7 in a manner entirely similar to that accomplished by circuitry 40 in FIG. 2. Modulation and control circuit 15A in FIG. 7 responds to 1) the presence or absence of detection of a 100 millivolt droop $\Delta V$ communicated across isolation barrier capacitors 104A,B by $\Delta V$ detector circuitry 5A, 2) an open circuit or short-circuit condition between output lines 10A and 10B, and 3) to the RMS (root mean square) value of the current in primary winding 7A, indicated by the voltage $V_I$ on conductor 21A developed across resistor $R_S$.

In accordance with the present invention, the current flowing through primary winding 7A (FIG. 5) is controlled by modulating the on time of switch 19 in response to the difference between $V_{REF}$ and $V_I$ with the off time being constant, as previously described. This precisely regulates the output current driven into battery 11. The battery charging circuit 1A therefore appears to be a current source as seen by battery 11.

Referring mainly to FIG. 7, sync circuit 40A functions entirely similarly to the corresponding circuitry in FIG. 2. The frequency divider circuit 42 functions essentially similarly to the corresponding circuitry in FIG. 2 to limit TO (Time Out) on conductor 132 to the amount of time that battery charger circuit 15A can operate in the fast charge mode to one hour, to thereby prevent overcharging battery 11 in the event of a $\Delta V$ detector malfunction.

Frequency divider circuit 42 also produces an "initial" hold signal HD on conductor 131 that causes battery charger 15A to operate in its fast charge mode for at least the first two minutes after battery charger 15A begins charging, because otherwise the battery terminal characteristics could indicate a false droop condition during the first two minutes of charging.

Frequency divider circuit 42 also produces a signal F/44 on conductor 128 that divides SYNC by a (rather arbitrary) factor of 44. This circuit is used to cause battery charger 15A to continue to detect $\Delta V$ droop signal of at least 100 millivolts for 22 consecutive SYNC pulses before allowing battery charger 15A to switch from its fast charge mode to its low charge mode. This reduces the likelihood of a noise condition being erroneously detected as a droop condition that switches the battery charger 15A into a trickle charge mode.

Control logic 115, in cooperation with driver timer circuit 122, determines in response to the signals SYNC, HD, TO, F/44, VDC, NL (no load), SC (short circuit), and DROOP1, whether the on time of switch 19 during each cycle of operation should be its maximum value corresponding to the fast charge mode, or at a minimum on time for each cycle of operation, corresponding to a trickle charge mode. Control logic 115 is, in essence, simply a state machine that responds to 1) a high level of HD to produce a fast charge mode for two minutes regardless of the condition of any of the other inputs, 2) a high condition of TO which occurs an hour after commencement of the fast charge mode independently of any of the other inputs, 3) presence of the DROOP1 signal on conductor 123 for 22 consecutive sync pulses before allowing switching from the fast charge mode to a trickle charge mode, and responds to a high condition of the NL or SC signals to switch from a fast charge mode to a trickle charge mode after the HD signal has elapsed. This avoids wasting power when NL is a "1" and avoids possible damage to the battery charger output circuitry when SC is a "1".

During the high current charging mode, IHI is a "1", and driver timer circuit 122 synchronizes TGATE, and hence the signal GATE produced by VFC (voltage to frequency converter) circuit 121 with HVDC, thereby synchronizing the turning on of switch 19 and hence also the current flow in the primary winding 7A with HVDC. (VFC circuit 121 can be implemented in various ways, for example in essentially the same manner as the circuitry of FIG. 3.) This synchronization results in switching the primary winding current off near the zero crossing points of the AC line current. This is compatible with a small filter capacitor in the line voltage rectifier 3, and eliminates power dissipation in the circuitry driving switch 19 during that time, resulting in maximum efficiency of battery charger operation in the fast charge mode. The battery droop voltage $\Delta V$ also is sensed during this period of zero battery charging current, eliminating inaccuracy caused by resistive voltage drops across battery charger cables and connection terminals.

The control logic 115 ignores DROOP1 except for the time following the trailing edge of the TGATE pulses. IHI changes state only when DROOP1 is a "1" during the low state of TGATE, and switch 19 is turned off. In the trickle charge mode, the efficiency of the battery charger is not critical because very little power is being delivered to the battery. The duty cycle of TGATE is increased during trickle mode operation in order to improve operation of the peak detector 106A in detecting a trickle output current magnitude.

During the fast charge mode of battery charger 1A, the 0.5 to 1.0 megahertz bursts of GATE are enabled by TGATE for approximately 50 percent of each line voltage cycle, during the times that HVDC experiences its peak values. The primary winding current, and hence the secondary winding current and the current supplied to charge battery 11, is a function of the magnitude of HVDC and the turns ratio of transformer 7. To accomplish this, driver timer 122 responds to the absolute value of HVDC to determine when it should be supplying charging current to battery 11, and the TGATE waveform in FIG. 8 clearly shows this relationship.

Battery charger 1A of FIG. 5 charges battery 11 at a pulsed rate equal to twice the AC line voltage frequency, and avoids generating noise that may interfere with external circuitry, such as cellular telephone circuitry, connected to the battery charger. Battery charger 1 of FIG. 1 accomplishes trickle mode charging by producing GATE pulses during only one out of every 11 line voltage cycles. That results in associated noise having very low frequency, approximately 12 hertz, which is so low that it may be difficult to remove by filter circuitry in a cellular telephone or the like powered by the battery being charged. Similar noise produced in battery charger 1A of FIG. 5 produces 120 hertz, rather than 12 hertz noise, which is much easier to filter out.

In FIG. 7, resistor 96 connected between IHI conductor 129 and conductor 124 changes the voltage $V_{ON}$ on conductor 120 which modulates the on time of switch 19 produced by GATE, but the frequency GATE is 0.5 to 1.0 megahertz, pulsed at twice the 60 hertz line frequency. It should be noted that the duty cycle of TGATE is modified between the fast and trickle charging modes so as to enable peak detector 106 in FIG. 6 to more easily detect the trickle charge mode and accordingly change the L/O signal on conductor 103.

Figure 8:
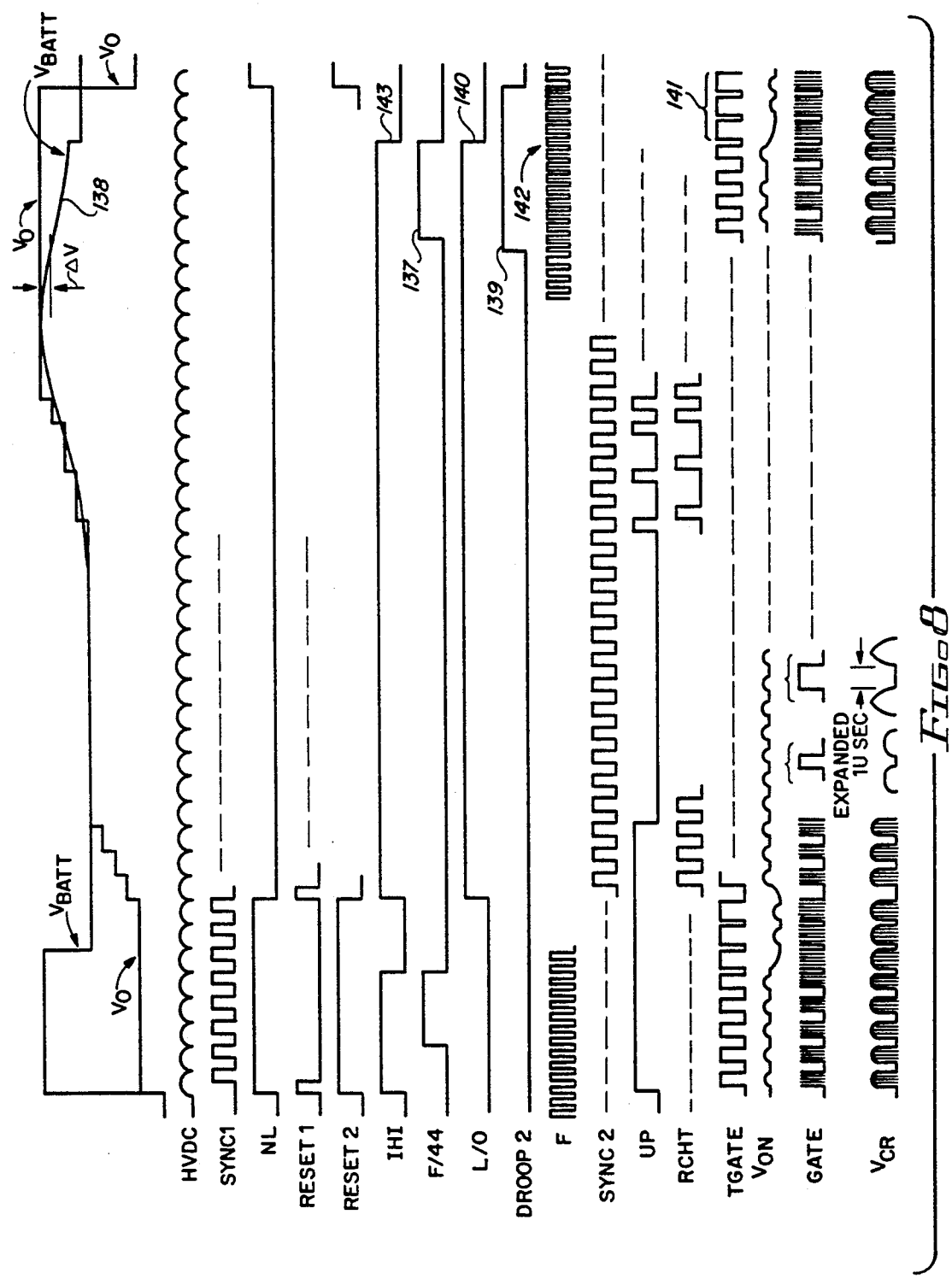
FIG. 8 is a timing diagram useful in describing the embodiment of the invention shown in FIGS. 5–7.

Referring to FIG. 8, each pulse 137 of the F/44 signal on conductor 128 is a "1" for durations of 22 cycles of the HVDC signal. When such a pulse coincides with the portion 138 of the $V_{BATT}$ (the signal representing voltage of battery 11) that is more than $\Delta V$ volts below the sampled and held voltage $V_0$, battery charger 1A switches to the trickle charge mode, and the duty cycle of TGATE is modified or increased as indicated by numeral 141 to indicate the trickle charge mode. IHI and L/O changes state at the same time, as indicated by numerals 140 and 143.

The $V_{ON}$ voltage on conductor 120 is converted to an on time of switch 19. The signal GATE has a frequency of one-half to one megahertz, and TGATE gates this high frequency carrier at the AC line frequency, producing variable width high frequency bursts constituting the signal GATE, as previously described with reference to FIG. 4.

Droop demodulator circuit 117 of FIG. 7 is a frequency-to-voltage converter that detects whether the pulses constituting the signals P and $\bar{P}$ are of a "low" frequency or a "high" frequency as shown by numeral 142 in FIG. 8 and produces a logic signal DROOP1 indicating whether a droop voltage $\Delta V$ of at least 100 millivolts has been detected.

Reference voltage generator circuit 116 generates a reference voltage $V_{REF}$ that is used by control logic 115 and driver timer 122. Block 116 also includes comparators that determine from the level of LVDC (which is analogous to $V_{SENSE}$ in FIGS. 1 and 3) whether a no load (NL) or short circuit (SC) condition appears between the battery charger output lines 10A and 10B.

Referring particularly to FIG. 6, $\Delta V$ detector/LED driver circuit 5A includes ratchet DAC 50 which functions in essentially the same manner as the circuit of FIG. 1 to produce an output $V_0$ that increases as RCHT continues to be produced by gate 53 to clock ripple counter 55 until $V_0$ equals the voltage $V_{BATT}'$ on conductor 44A, which is a scaled down representation of the battery voltage produced by voltage divider 86A,86B. Since DAC 50 functions as a sample and hold circuit, when $V_{BATT}'$ falls or "droops" by $\Delta V$, this is detected by window comparator 110, producing a signal DROOP2 on conductor 111 indicating whether the droop $\Delta V$ is at least 100 millivolts. If DROOP2 is a "1", this causes VFC (voltage-to-frequency converter) driver circuit 112 to produce complementary high frequency or low frequency signals F and $\bar{F}$ on conductors 113A and 113B to be coupled across isolation barrier capacitors 104A and 104B to modulation and control circuit 15A.

Window comparator circuit 110 causes DROOP2 to have a high level only if the droop voltage $\Delta V$ is between an upper limit and a lower limit of, for example, 100 millivolts to 200 millivolts.

The voltage ripple signal ($V_{RIP}$) produced on conductor 102 by rectifier 10 of FIG. 5 contains a large amount of high frequency switching noise at the 500 KHz to 1 MHz frequency of the GATE signal. Inductor 107 filters out a substantial portion of such high frequency noise. The SYNC2 circuit included in block 106 uses the difference between the unfiltered VRIP signal on conductor 102 and the filtered B+voltage on conductor 10A to produce the signal SYNC2 on conductor 135. (It is necessary to generate the SYNC2 signal because a signal synchronized with the HVDC signal is required on both sides of isolation transformer 7.) The SYNC2 circuit in block 106 consists of a comparator that compares the unfiltered VRIP signal with the filtered B+voltage to generate pulse signals with edges that coincide with the peaks and valleys of the current that charges battery 11.

The peak detector circuit included in block 106 produces the LED output control signal L/O on conductor 103. The peak detector circuit in block 106 is simply a rectifier and capacitor. The average voltage across that rectifier and capacitor indicates whether battery 11 is being charged in the fast charge mode or in the trickle charge mode. When the battery charger circuit is in its fast charge mode, the high frequency noise components of VRIP have a higher average value than in the trickle charge mode. This higher average value produces a high level of L/O.

Comparator 105 generates a signal RESET2 to reset ripple counter 55 when battery 11 is disconnected from terminals 10A and 10B, thereby resetting $V_0$ of DAC 50 to its minimum output level.

It should be appreciated that although battery charger 1A of FIG. 5 communicates a signal that represents only the presence or absence of detection of a $\Delta V$ voltage droop which indicates a fully charged NiCad battery across the capacitive isolation barrier 104A,104B to modulation and control circuit 15A, it would be possible to linearly change the frequency of the signal coupled across isolation barrier capacitors 104A and 104B to linearly represent the present battery voltage. The $\Delta V$ detection then could be performed as in the battery charger 1 of FIGS. 1-3 on the AC line voltage side of transformer 7. That approach, however, requires very accurate modulation and demodulation of the frequency representing the battery voltage. Battery charger 1 of FIGS. 5-7 does not require such accurate modulation and demodulation.

Figure 10:
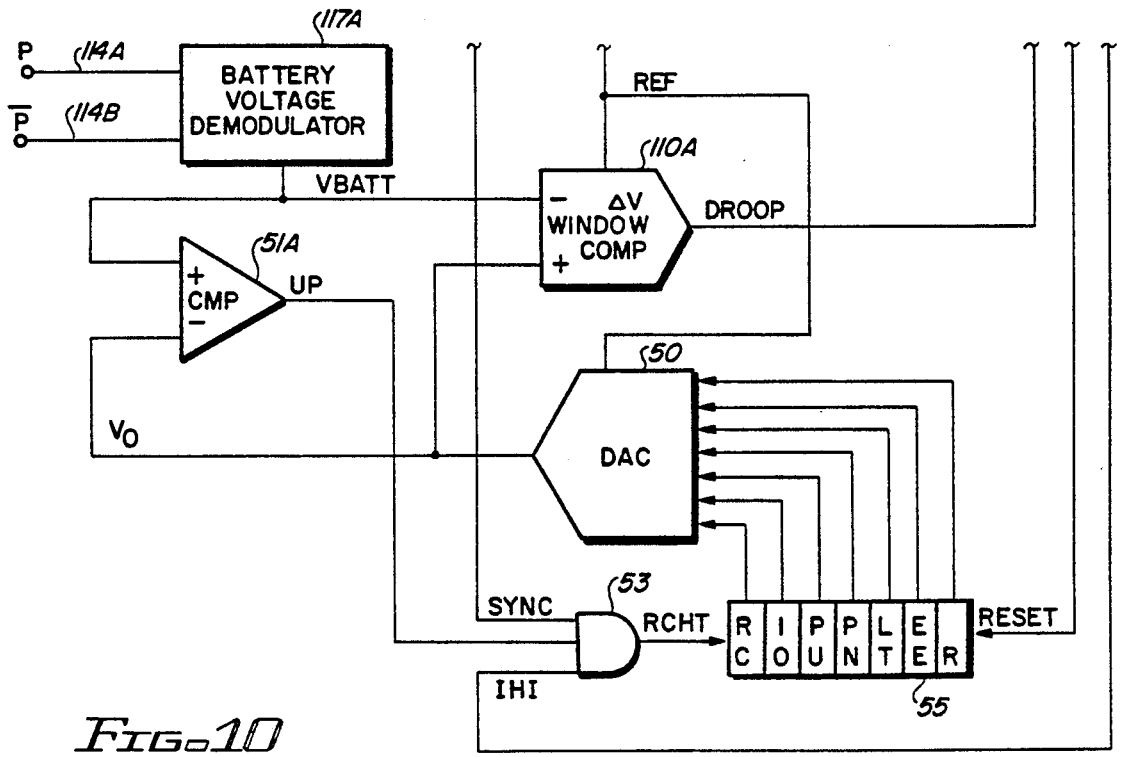
FIG. 10 is a block diagram disclosing part of the circuitry in block 15B of FIG. 9.
Figure 9:
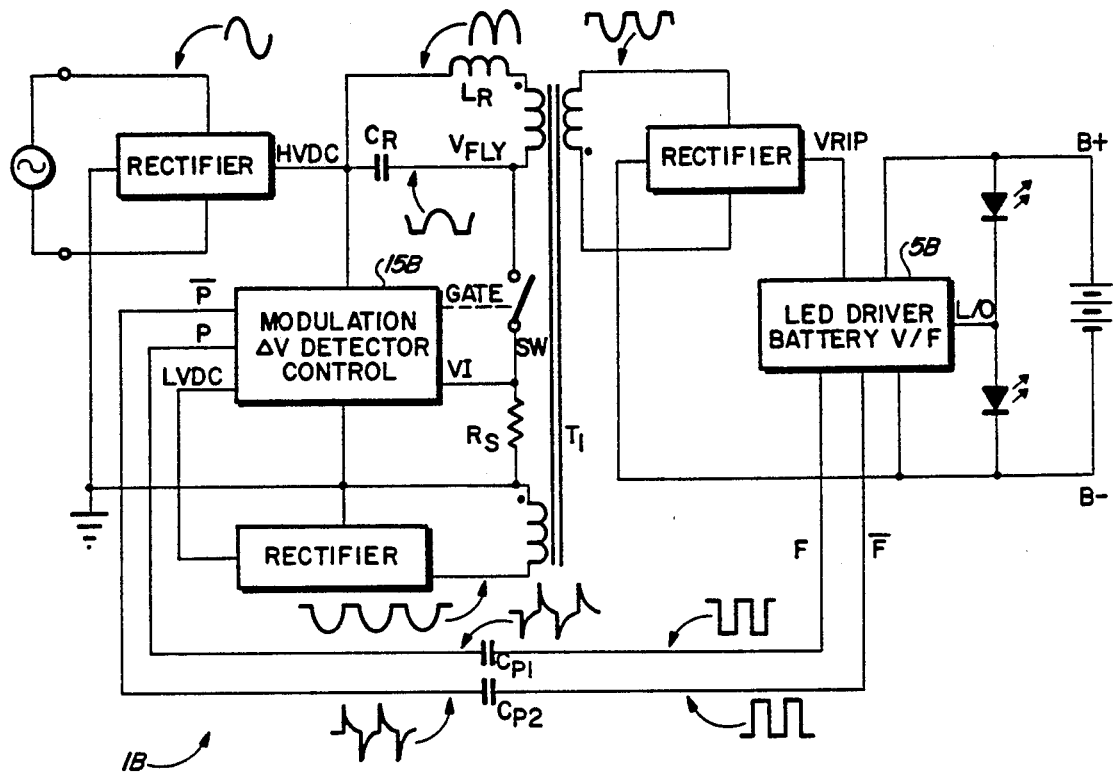
FIG. 9 is a block diagram of another embodiment of the battery charger.
Figure 11:
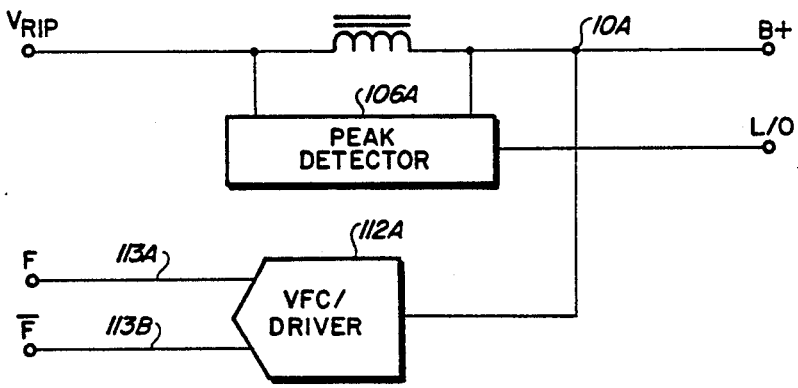
FIG. 11 is a block diagram of part of the circuitry contained in block 5B of FIG. 9.

The foregoing approach is illustrated in FIG. 9, in which battery charger 1B is very similar to battery charger 1A of FIG. 5, except that the $\Delta V$ detecting circuit in block 5A of FIG. 5 instead is included in block 15B of FIG. 9. FIGS. 10 and 11 show more specifically which components in the $\Delta V$ detector circuit shown in FIG. 6 have been moved to the opposite side of isolation barrier capacitors 104A and 104B. The same reference numerals, followed by the letter "A", have been used to designate components which have been moved from block 5A of FIG. 5 to block 15B of FIG. 9.

The battery condition voltage produced in battery charger 1B of FIG. 9 is provided as an input to a voltage-to-frequency/ driver circuit 112A, as shown in FIG. 11, to produce the signals F and $\bar{F}$ on conductors 113A and 113B, respectively. As shown in FIG. 10, the $\Delta V$ detector circuitry in block 15B includes a conventional battery voltage demodulator circuit 117A, which receives the signals P and $\bar{P}$ coupled across the capacitive isolation barrier on conductors 114A and 114B, respectively.

Battery charger 1A of FIGS. 5-7 has the important advantage over the embodiment of FIG. 1 that large changes in amplitude of the AC line voltage are much less likely to cause a "false droop" condition that prematurely switches battery charger 1A from the fast charge mode to the trickle charge mode. This is because the measurement of the battery voltage condition on the "battery side" of transformer 7 and transmitting thereof across isolation barrier capacitors 104A,104B in the embodiment of FIGS. 5-7 is more accurate than rectifying the output of the secondary winding 7C in the embodiment of FIG. 1.

Battery charger 1A of FIG. 5 and battery charger 1B of FIG. 9 also have the advantage of high efficiency, producing a maximum amount of charging current to battery 11 without undergoing excessive temperature increases. This is important since the battery charger circuit in some embodiments is housed in a very small package, such as in a male plug of a power cord.

It has been discovered that although the average AC line voltage amplitude rarely undergoes large variations, the amplitude variation between adjacent cycles of the line voltage frequently is very large, for example, 10 to 20 percent. The utilization of the F/44 signal on conductor 133 in cooperation with the circuitry in driver timer circuit 122 requires 22 consecutive $\Delta V$ droop detections before modifying the TGATE voltage on conductor 134 switch from the fast charge mode to the trickle charge mode. This avoids false trickle charge mode changes due to amplitude variations of one or a small number of cycles of the AC line voltage.

The pulses conducted across isolation barrier capacitors 104A and 104B are only demodulated during intervals of time during which the switch 19 is open and the primary winding is not energized. The TGATE signal enables or disables the GATE signal on conductor 16 to switch 19 every cycle of the AC line voltage. This avoids the effects of noise being coupled from the primary winding to the isolation barrier capacitors 104A and 104B, allowing more accurate demodulation.

By performing the $\Delta V$ voltage droop detection during times when no current is flowing in the primary winding 7A, the effect of voltage drops across the battery cable conductors 10A and 10B are avoided, resulting in more accurate $\Delta V$ measurements. This is important in applications in which a long cable is required between the battery and the charger.

As previously explained, primary winding 7A is energized only part of the time, which is centered about the times of occurrence of the peak levels of the HVDC signal on conductor 4. The feedback loop involving primary winding 7A adjusts the on time of MOSFET 19 to achieve a desired output current at a relatively constant level. That constant level is a high level during the fast charge mode and a low level during the trickle charge mode.

It has been discovered that the resonant frequency of the primary winding circuit including the inductance of primary winding 7A and capacitor 18 varies, depending upon load conditions and whether battery charge circuit 1 is operating in the fast charge mode or the trickle charge mode. One cause of the change in the primary winding inductance is believed to be the saturation effect in the magnetic materials. As the magnetic field strength H increases over a large range, the magnetic flux density B increases nonlinearly. The H field is proportional to the primary winding current, so the primary winding 7A has a smaller average inductance during the fast charge mode than during the trickle charge mode.

Consequently, it has been recognized that the off time of switch 19 should be less during the fast charge mode than during the trickle charge mode in order to maintain zero-voltage switching. Otherwise, the MOSFET switch 19 will unnecessarily dissipate excess power, and there will be more power loss in the primary winding because the magnetic flux will not have had time to return to zero for each cycle of the primary winding resonant circuit.

Referring to FIG. 12, the AC input line voltage and HVDC waveforms are shown again for reference. Portions of the signal GATE on conductor 16 are illustrated for the fast charge mode, as indicated by 170, and the trickle charge mode, as indicated by 171, centered about the peaks of the HVDC signal. Several individual pulses of GATE with an expanded horizontal scale are illustrated below the GATE waveform. As indicated by 172A, the duty cycle of GATE is maximum closest to the "valleys" of HVDC. As indicated by numeral 172B, the duty cycle of GATE is minimum at the peaks of HVDC. The same is true in the trickle charge mode, as indicated by pulses 173A and 173B.

The flyback voltage $V_{CR}$ on conductor 17 is shown in FIG. 12 for both the fast and trickle charge modes. The above mentioned increase in the inductance of primary winding 7A and the corresponding increase in the resonant period of the primary winding circuit causes MOSFET 19 to turn on before the sinusoidally shaped $V_{CR}$ waveform has had sufficient time to return to zero in the trickle charge mode. This premature turn on of MOSFET 19 is indicated by solid lines 176A and 176B in FIG. 12, and causes the flyback voltage $V_{CR}$ on conductor 17 to rapidly fall to ground. This premature turn on of MOSFET 19 causes substantial current to flow through primary winding 7A when there is still a large value of $V_{CR}$ voltage across it. This, of course, causes substantially increased power dissipation in MOSFET 19, and also causes other problems, such as increased generation of noise harmonics.

In accordance with another embodiment of the invention, the off time of MOSFET 19 is increased enough during trickle charge operation to ensure that the flyback voltage $V_{CR}$ returns to zero before MOSFET 19 is turned on, ensuring that zero current switching is achieved despite variations in the inductance of primary winding 7A caused by varying load conditions and the like.

In FIG. 12, dotted lines 174A and 174B of the expanded GATE pulses illustrate increasing the off time of MOSFET 19 (i.e., delaying the turning on of MOSFET 19) to compensate for the increased inductance of primary winding 7A when the circuit is operated in the trickle charge mode in order to allow the flyback voltage $V_{CR}$ to return to zero, as indicated by dotted lines 177A and 177B.

It should be noted that the increased magnetic flux and the increase of primary winding inductance that occurs when battery charging circuit 1 is switched from the fast charge mode to the trickle charge mode is caused by the decrease of the on time of MOSFET 19 in the manner previously explained. The decrease in the average primary winding current decreases the average magnetic flux in the primary winding 7A.

In FIG. 12, the on time of MOSFET 19 typically might be 700 nanoseconds for fast charge operation and 100 nanoseconds for trickle charge operation. The resulting reduction in average current in primary circuitry 7A might increase the inductance of primary winding 7A enough that the off time of MOSFET 19 might need to be increased from one microsecond to 1.3 microseconds in order to allow flyback voltage $V_{CR}$ return to zero, as indicated by dotted line 177B, before the MOSFET switch 19 is turned back on.

Consequently, circuit parameters which either determine or are determined by the modulation of the on time of MOSFET 19 can be used to adjust the off time of MOSFET 19 in a manner so as to avoid turning on of MOSFET 19 before the flyback voltage $V_{CR}$ has returned to zero.

Figure 13:
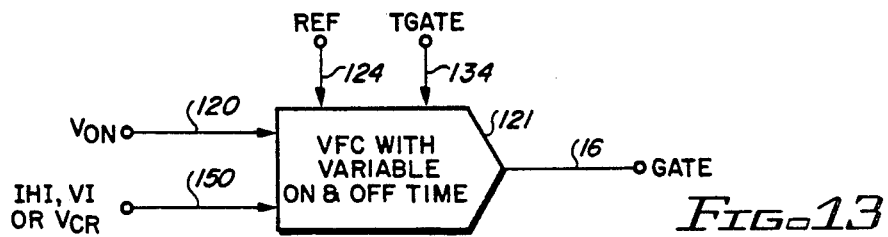
FIG. 13 is a block diagram useful in explaining an approach to compensating for variations in the resonant period of the resonant circuit including the primary winding of the transformer in FIG. 5.

FIG. 13 is referred to for a general description of how the modulation circuit of FIG. 7 can be modified to provide automatic adjustment of the off time of MOSFET 19 to achieve zero-voltage current switching of the primary winding current despite the change in average primary inductance caused by switching from the fast charge to the trickle charge mode. As indicated in FIG. 13, the voltage-to-frequency converter (VFC) 121 is modified to provide both variable on times and variable off times for MOSFET 19. The $V_{ON}$ input on conductor 120 and the TGATE input on conductor 134 are still needed to control modulation of the on time of MOSFET 19, as in FIG. 7. To modulate the off time of MOSFET 19, the voltage REF on conductor 12 is provided as an input (REF is produced by generator circuitry in block 116 of FIG. 7).

One of the signals IHI, VI, or $V_{CR}$ also is used to control modulation of the off time. The signal IHI is a digital signal that indicates when battery charger circuit 1 is operating in the fast charge mode. The signal VI is an analog signal that represents the average primary winding current.

It is possible to use a simple digital control including circuitry for generating two alternative off times for MOSFET switch 19, providing zero-voltage current switching for the fast charge mode and the trickle charge mode. If there is so much variation of the primary winding inductance that continuous adjustment of the off time of MOSFET 19 is needed, the sensing of the flyback voltage $V_{CR}$ on conductor 17 as it returns close to zero can be sensed and used to determine the end of the off time of MOSFET 19 and thereby cause its on time to begin.

FIG. 14 illustrates an implementation of flyback-terminated off time of MOSFET 19. The flyback voltage $V_{CR}$ on conductor 17 is divided across series connected resistors 154 and 155 to produce an alternated input signal on the inverting input of comparator 151. That signal is compared to the reference signal REF on conductor 124. Comparator 151 produces a positive-going output when the inverting input of comparator 51 falls below REF. Assuming that RS flip-flop 160 is initially reset, that pulse is gated through AND gate 152 to a Set input of RS flip flop 160. RS flip-flop 160 then produces a positive-going pulse on its Q output, and its $\overline{Q}$ output goes to a "0", preventing further positive pulses on the output of comparator 151 from being applied to the Set input of flip-flop 106.

The Q output of flip-flop 160 is gated through AND gate 161 in response to TGATE during peak portions of HVDC and is passed through a buffer circuit 162 to provide the signal GATE on conductor 16. Thus, it can be seen that turn on of MOSFET 19 is initiated when the flyback voltage $V_{CR}$ crosses a certain threshold established by REF and voltage divider resistors 154 and 155.

The $\overline{Q}$ output of flip-flop 160 also opens switch 159, which until then grounds conductor 158, maintaining capacitor 157 discharged. The opening of switch 159 permits capacitor 157 to be charged through resistor 156, producing a ramp voltage on conductor 158 which is applied to the non-inverting input of comparator 153. The voltage $V_{ON}$ on conductor 120 is applied to the inverting input of comparator 153. (As previously explained, $V_{ON}$ represents the amplified difference or error between the actual input current and the desired input current flowing through primary winding 7A.)

When the ramp voltage on conductor 158 exceeds $V_{ON}$, the output of comparator 153 resets flip-flop 160. This causes its Q output to go to a "0" ground and causes $\overline{Q}$ to go to a "1", initiating turn off of MOSFET 19, in effect modulating the on time of MOSFET as a function of average current in primary winding 7A.

Thus, the implementation of FIG. 14 determines both the on time and the off time of MOSFET 19, the on time being determined by the average current flowing through the primary winding, and the off time being determined by the flyback voltage $V_{FLY}$ returning sufficiently close to zero that zero-voltage current switching of MOSFET 19 is accomplished. Excessive power dissipation and harmonic noise generation are thereby avoided.

To summarize, the ending of the off time and the beginning of the on time of MOSFET 19 is triggered by return of the flyback voltage $V_{CR}$ to a level near zero. Ending of the time and beginning of the off time is triggered by comparator 153 when the ramp voltage on conductor 158 exceeds a level represented by the average current through primary winding 7A.

Figure 15:
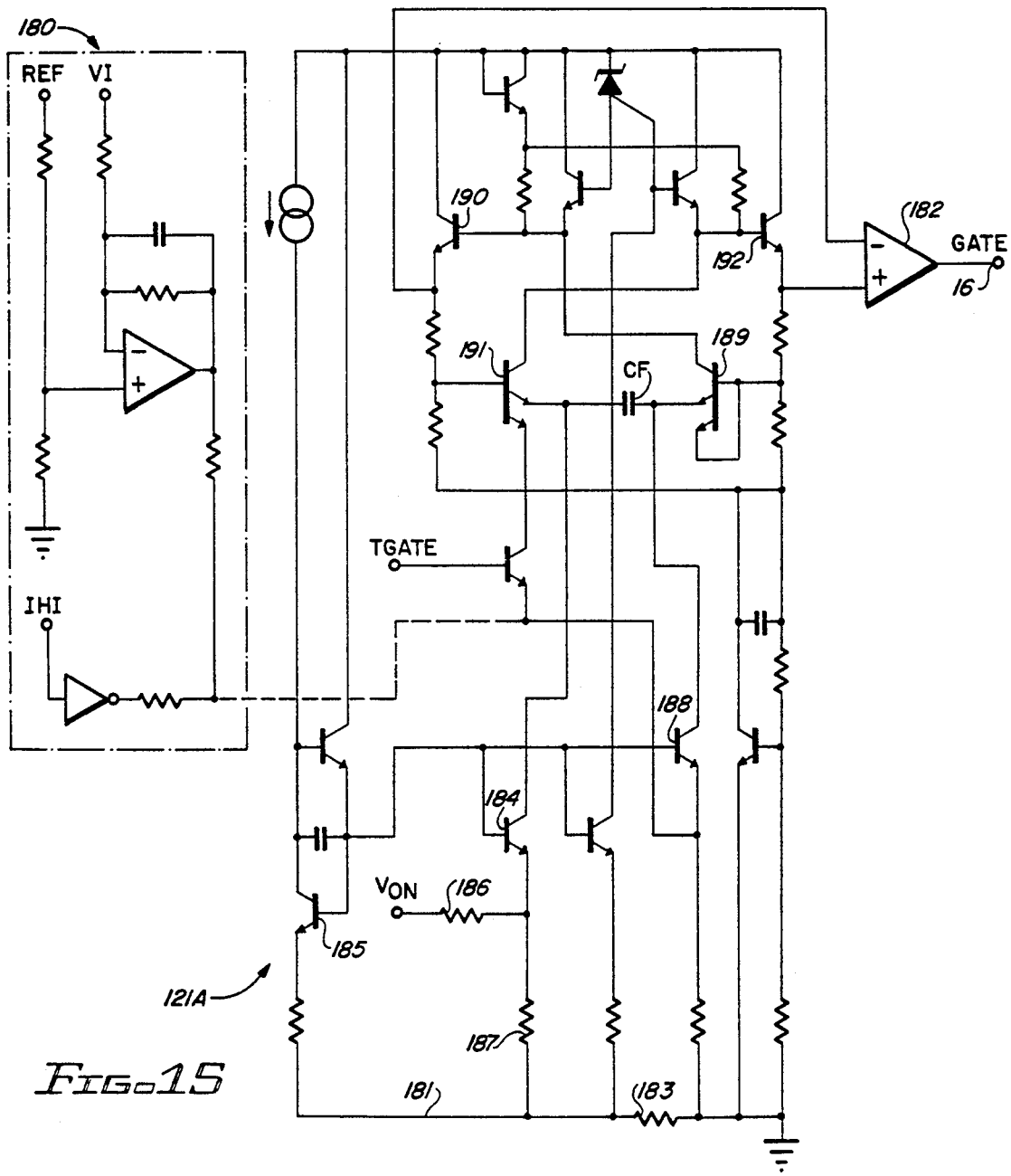
FIG. 15 is a schematic diagram illustrating another approach to modulating the off time of the primary winding switch.

FIG. 15 illustrates the circuitry of an embodiment 121A of voltage-to-frequency converter 121 of FIG. 7 modified slightly to provide variable, rather than constant off times for MOSFET 19. The implementation of voltage-to-frequency converter 21A is relatively straightforward to one skilled in the art, so only the structural and operational aspects of it pertinent to modulation of the off times of MOSFET 19 will be described. In FIG. 15, resistor 183, which is connected between ground and conductor 181 controls the amount that the off time of MOSFET 19 is changed as the voltage $V_{ON}$ on conductor 120 is increased.

The off times of MOSFET 19 are inversely proportional to the current through transistor 188, and the on times are proportional to the current through transistor 184. Resistor 183, which can be 30 ohms, varies the current through transistor 188 as $V_{ON}$ increases.

As $V_{ON}$ increases while MOSFET 19 is off, the current through resistor 186 increases, and flows through resistor 187 and through resistor 183 to ground. The resulting voltage developed across 183 is translated through the emitter-base junction of transistor 185 to its base, and from there to the base of transistor 188, increasing the current through transistor 188 and increasing the rate of discharge of capacitor C, across which a ramp voltage is developed by the current in transistor 188. The increased discharge rate of the ramp voltage across capacitor C causes transistor 189 to turn on sooner than it otherwise would, thereby turning on MOSFET 19 sooner and decreasing its off time. When transistor 189 turns on, the voltage-to-frequency converter 121A switches state. The collector current of transistor 189 reduces the voltage on the base of transistor 190, producing a corresponding decrease in the emitter voltage of transistor 190 which is applied to the inverting input of buffer 182. The signal GATE on conductor 16 then rises, turning on MOSFET 19 and hence terminating its off time.

If resistor 183 is replaced by a short circuit between conductor 181 and ground, then no increase occurs in the current through transistor 188 as $V_{ON}$ increases, and there is no increase in the rate of charge of ramp voltage occurring at the emitter of transistor 189 and no modulation of the off time of MOSFET 19 as a function of $V_{ON}$.

As $V_{ON}$ increases while MOSFET 19 is on, the voltage of the emitter of transistor 184 rises, decreasing the current through it. This increases the amount of time required for the discharge of capacitor CF. The voltage of the emitter of transistor 191 falls more slowly, causing transistor 191 to turn on later. When transistor 191 finally turns on, the base and emitter voltages of transistor 192 decrease, reducing the voltage on the non-inverting input of buffer 182. This causes the signal GATE on conductor 16 to fall and this occurs later than it would if $V_{ON}$ were not increasing, thereby increasing the on time of MOSFET 19.

The circuitry enclosed within dashed line 180 illustrates several optional alternative techniques for modulating the off time of MOSFET 19. VI or IHI could be used as generally indicated to vary the current in transistor 188 and thereby modulate the off time of MOSFET 19.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, battery charger 1A could be modified to receive the 12 volt DC voltage produced by an automobile battery at conductor 4. The battery charger thus modified could charge up the battery of a cellular telephone in an automobile. Since a SYNC signal could not be derived from the 12 volt DC car battery voltage, a suitable oscillator would have to be provided to produce the SYNC signal. There are instances in which it is preferable to detect a fully charged battery condition by means other than determining that the battery voltage has experienced a droop $\Delta V$. For example, a predetermined temperature change is sometimes used to indicate a fully charged battery condition. In such a circuit, the resonant primary circuit operation, the precise control of primary winding current to control the amount of charge current delivered to the battery, and the techniques described herein for providing very low noise on the battery terminals have the same advantages as described above.

What is claimed is:

1. A battery charger comprising in combination:

(a) a first rectifier receiving a line voltage and producing a rectified sinusoidal voltage;

(b) a transformer having a primary winding coupled to receive the rectified sinusoidal voltage and a secondary winding, a second rectifier being coupled between terminals of the secondary winding and terminals of a battery;

(c) a switch coupled in series relation with a terminal of the primary winding;

(d) means coupled to the switch for producing a signal indicative of current flowing through the switch and primary winding;

(e) battery condition means for producing a battery condition voltage representative of a voltage between the terminals of the battery;

(f) peak detect and hold means coupled to receive the voltage proportional to the battery condition voltage and detect and hold a peak value thereof;

(g) voltage droop measuring means for comparing an output voltage of the peak detect and hold means with the voltage proportional to the battery condition voltage to produce a voltage droop signal when the voltage proportional to the battery condition voltage falls a predetermined threshold voltage below the output voltage of the peak detect and hold means; and (h) modulating means coupled to receive a signal representative of the voltage droop signal and the signal indicative of current flowing through the primary winding for producing a control signal applied to the switch to control flow of current through the primary winding in accordance with the battery condition voltage, the modulating means including means for producing a turn off time for the switch equal to a predetermined proportion of a resonant period of the primary winding and means for varying turn on time for the switch in response to the signal indicative of current flowing through the primary winding.

2. The battery charger of claim 1 wherein the turn off time varies inversely with the turn on time to compensate for changes in inductance of the primary winding.

3. The battery charger of claim 1 wherein the battery condition means includes isolation barrier means coupled between the terminals of the battery and having an output that is DC isolated from the battery for producing the battery condition voltage.

4. The battery charger of claim 1 wherein the battery condition means is coupled between the terminals of the battery, the battery charger further including isolation barrier means for coupling the voltage droop signal from the voltage droop measuring means to the modulating means.

5. The battery charger of claim 4 including means coupled to one port of the isolation barrier means for converting the voltage droop signal to a digital signal having a first frequency if the voltage droop signal is present and a second frequency if the voltage droop signal is not present, and means coupled to another port of the isolation barrier means for demodulating the digital signal to produce the signal representative of the voltage droop signal.

6. The battery charger of claim 1 wherein the battery condition means is coupled between the terminals of the battery, the battery charger further including isolation barrier means for coupling the battery condition voltage from the battery condition means to the peak detect and hold means.

7. The battery charger of claim 6 wherein the battery condition means includes voltage-to-frequency converting means for producing a digital signal the frequency of which represents the voltage of the battery, the isolation barrier means coupling the digital signal from the voltage-to-frequency converting means to the peak detect and hold means.

8. The battery charger of claim 7 wherein the peak detect and hold means includes means for receiving the digital signal coupled by the isolation barrier means and converting it to an analog signal representing the battery voltage.

9. The battery charger of claim 1 including means responsive to the rectified sinusoidal voltage for producing a timing signal, wherein the peak detect and hold means includes a DAC having an output coupled to a first input of a comparator, a ripple counter having outputs coupled to digital inputs of the DAC and a gate circuit having an output coupled to a toggle input of the ripple counter, an output of the comparator being coupled to a first input of the gate circuit, a second input of the gate circuit being coupled to receive the timing signal.

10. The battery charger of claim 1 wherein the means for varying the turn on time continuously varies the turn on time between a maximum turn on time during a valley of the rectified sinusoidal voltage and a minimum turn on time during a peak of the rectified sinusoidal voltage during each half cycle of the line voltage to thereby maximize power delivered to the battery.

11. The battery charger of claim 10 wherein the means for varying the turn on time includes means for synchronizing the control signal with the rectified sinusoidal voltage in order to synchronize the current flowing through the primary winding with the rectified sinusoidal voltage.

12. The battery charger of claim 11 wherein the battery condition means includes means for producing the battery condition voltage when the current flowing through the primary winding is essentially equal to zero to avoid inaccuracy in the voltage droop signal due to resistive voltage drops in connections coupling the battery to the second rectifier.

13. A method of charging a battery using a battery charger, comprising the steps of:
(a) rectifying an AC voltage to produce a sinusoidal rectified voltage and applying it to a primary winding of a transformer, a rectifier being coupled between terminals of a secondary winding of the transformer and terminals of a battery to supply a rectified charging current to the battery;
(b) operating a switch coupled in series with a terminal of the primary winding to control current through the primary winding;
(c) producing a signal indicative of primary winding current;
(d) producing a battery condition voltage representative of voltage between the terminals of the battery;
(e) detecting and storing a peak value of a reference voltage proportional to the battery condition voltage;
(f) comparing the stored peak value with the voltage proportional to the battery condition voltage to produce a charging mode signal with a low charging mode state when the voltage falls a predetermined threshold voltage below the peak value; and
(g) controlling flow of current through the switch by turning the switch off for times equal to a predetermined proportion of a resonant period of the primary winding and turning the switch on for times which vary in response to the signal indicative of the primary winding current.

14. A method of charging a battery using a battery charger, comprising the steps of:
(a) rectifying an AC voltage to produce a sinusoidal rectified voltage and applying it to a primary winding of a transformer, a rectifier being coupled between terminals of a secondary winding of the transformer and terminals of a battery to supply a rectified charging current to the battery;
(b) operating a switch coupled in series with a terminal of the primary winding to control current through the primary winding;
(c) producing a signal indicative of primary winding current;
(d) controlling flow of current through the switch by turning the switch off for times equal to a predetermined proportion of a resonant period of the primary winding and turning the switch on for times which vary in response to the signal indicative of the primary winding current;
(e) producing a battery charge condition signal indicating that the battery has been substantially fully charged in a fast charge mode; and
(f) reducing the amounts of time the switch is turned on in step (d) in response to the battery charge condition signal to continue charging of the battery in a trickle charge mode.

15. The method of claim 14 wherein step (d) includes continuously varying turn on times of the switch between a maximum turn on time during a valley of the rectified sinusoidal voltage and a minimum turn on time during a peak of the rectified sinusoidal voltage during each half cycle of the line voltage to thereby maximize power delivered to the battery.

16. A battery charger, comprising in combination:
(a) means for rectifying an AC line voltage to produce a sinusoidal rectified voltage;
(b) a transformer having a primary winding receiving the sinusoidal rectified voltage;
(c) a rectifier coupled between terminals of a secondary winding of the transformer and terminals of a battery to supply a rectified charging current to the battery;
(d) a switch coupled in series with a terminal of the primary winding to control current through the primary winding;
(e) means for operating the switch to control current through the primary winding;
(f) means for producing a signal indicative of primary winding current;
(g) means for controlling flow of current through the switch by turning the switch off for times proportional to a resonant period of the primary winding and turning the switch on for times which vary in response to the signal indicative of the primary winding current;
(h) means for detecting a battery charge condition and producing a battery charge condition signal indicating that the battery has been substantially fully charged in a fast charge mode; and
(i) means for reducing a duty cycle of times the switch is turned on in response to the battery charge condition signal to continue charging of the battery in a trickle charge mode.

17. A method of charging a battery, comprising the steps of:
(a) rectifying an AC line voltage to produce a sinusoidal rectified voltage and applying it to a primary winding of a transformer, a rectifier being coupled between terminals of a secondary winding of the transformer and terminals of a battery to supply a rectified charging current to the battery;
(b) causing a resonant circuit including inductance of the primary winding and a capacitor coupled thereto to resonate at a predetermined frequency while a switch coupled to a terminal of the primary winding is off;
(c) operating the switch coupled in series with a terminal of the primary winding to cause current to flow through the primary winding and stop the resonating;
(d) producing a signal indicative of the current flowing through the primary winding; and
(e) controlling flow of current through the switch by turning the switch off for times generally proportional to the period of the predetermined frequency and turning the switch on for times which vary in response to the signal indicative of the primary winding current.

18. The method of claim 17 including producing a battery charge condition signal indicating that the battery has been substantially fully charged in a fast charge mode, and reducing the amounts of time the switch is turned on in step (e) in response to the battery charge condition signal to continue charging of the battery in a trickle charge mode.

19. The method of claim 17 wherein step (e) includes continuously varying turn on times of the switch between a maximum turn on time during a valley of the rectified sinusoidal voltage and a minimum turn on time during a peak of the rectified sinusoidal voltage during each half cycle of the line voltage to thereby maximize power delivered to the battery.

20. The method of claim 19 wherein the minimum turn on time is zero, to reduce power dissipation in a circuit driving a control electrode of the switch.

21. The method of claim 17 wherein step (e) includes turning the switch off for times that increase in response to a decrease in the current in the primary winding.

22. The method of claim 17 wherein step (e) includes turning the switch off for times determined in response to a signal indicative of whether the battery is being charged by a trickle charge current.

23. The method of claim 17 wherein step (e) includes sensing a flyback voltage on the terminal of the primary winding to produce a control signal when the flyback voltage decreases to a predetermined level, and turning the switch on in response to the control signal.

24. A battery charger comprising in combination:
(a) means for rectifying an AC line voltage to produce a sinusoidal rectified voltage;
(b) a transformer having a primary winding receiving the sinusoidal rectified voltage;
(c) a resonant circuit including inductance of the primary winding and a capacitor coupled thereto having a resonant frequency;
(d) a switch coupled in series with a terminal of the primary winding to control current through the primary winding, the resonant circuit resonating while the switch is off;
(e) means for operating the switch to cause current to flow through the primary winding and stop the resonating;
(f) means for producing a signal indicative of the current flowing through the primary winding;
(g) means for controlling flow of current through the switch by turning the switch off for times proportional to the period of the resonant frequency and turning the switch on for times which vary in response to the signal indicative of the primary winding current; and
(h) a secondary winding and means coupling first and second terminals of the secondary winding to first and second terminal, respectively, of a battery.

25. The battery charger of claim 24 including means for producing a battery charge condition signal indicating that the battery has been substantially fully charged in a fast charge mode, and means for reducing the amounts of time the switch is turned on in response to the battery charge condition signal to continue charging of the battery in a trickle charge mode.

26. A battery charger comprising in combination:
(a) a rectifier circuit operative to rectify an AC line voltage to produce a sinusoidal rectified voltage;
(b) a transformer having a primary winding receiving the sinusoidal rectified voltage;
(c) a resonant circuit including inductance of the primary winding and a capacitor coupled thereto having a resonant frequency;
(d) a switch coupled in series with a terminal of the primary winding to control current through the primary winding, the resonant circuit resonating while the switch is off;
(e) a sensing circuit coupled to the primary winding and operative to produce a signal indicative of the current flowing through the primary winding;
(f) a control circuit coupled to the sensing circuit and operative to turn the switch off for times proportional to the period of the resonant frequency and to turn the switch on for times which vary in response to the signal indicative of the primary winding current; and
(g) a secondary winding including first and second terminals coupled to first and second terminal, respectively, of a battery.

27. The battery charger of claim 26 wherein the control circuit includes means for turning the switch off for times that increase as the current in the primary winding decreases.

28. The battery charger of claim 26 wherein the control circuit includes a timing circuit connected to receive the signal indicative of the primary winding current and adapted to operate in response thereto to turn the switch off for times that increase as the amount in the primary winding decreases and decrease as the current in the primary winding increases.

29. The battery charger of claim 26 wherein the control circuit includes means for delaying turning the switch on in response to a signal indicating that the battery is being charged by a trickle charge current.

30. The battery charger of claim 26 wherein the control circuit includes a timing circuit connected to receive a signal indicating that the battery is being charged by a trickle charge current and adapted to delay turning the switch on in response to the signal indicating that the battery is being charged by a trickle charge current.

31. The battery charger of claim 26 wherein the control circuit includes means for sensing a flyback voltage on the terminal of the primary winding to produce a control signal when the flyback voltage decreases to a predetermined level, and means for turning the switch on in response to the control signal.

32. The battery charger of claim 26 wherein the control circuit includes a flyback voltage comparison circuit operative to produce an output signal when the flyback voltage decreases to a predetermined level, and a switch control circuit operative to turn the switch on in response to the output signal produced by the comparison circuit.

* * * * *